United States Patent
Kovalev

(10) Patent No.: US 6,339,616 B1
(45) Date of Patent: *Jan. 15, 2002

(54) METHOD AND APPARATUS FOR COMPRESSION AND DECOMPRESSION OF STILL AND MOTION VIDEO DATA BASED ON ADAPTIVE PIXEL-BY-PIXEL PROCESSING AND ADAPTIVE VARIABLE LENGTH CODING

(75) Inventor: Sergey I. Kovalev, St. Petersburg (RU)

(73) Assignees: Alaris, Inc., Fremont; G. T. Technology, Inc., Saratoga, both of CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/866,193

(22) Filed: May 30, 1997

(51) Int. Cl.[7] ................................................. H04N 7/12
(52) U.S. Cl. ................................. 375/240.16; 348/699
(58) Field of Search ................................ 348/400–467, 348/407–413, 415–416, 384, 390, 699, 700, 571; 382/237, 246, 248; 386/109, 111–112; 375/240.16, 240.17; H04N 7/30, 7/32

(56) References Cited

U.S. PATENT DOCUMENTS

| 4,578,704 A | * | 3/1986 | Gharavi | 348/409 |
| 4,910,594 A |   | 3/1990 | Kondo | 358/138 |
| 5,200,820 A | * | 4/1993 | Gharavi | 348/416 |
| 5,231,484 A |   | 7/1993 | Gonzales et al. | 358/133 |
| 5,325,126 A |   | 6/1994 | Keith | 348/418 |
| 5,367,331 A |   | 11/1994 | Secher et al. | 348/14 |
| 5,367,629 A |   | 11/1994 | Chu et al. | 395/162 |
| 5,392,072 A |   | 2/1995 | Rodriguez et al. | 348/405 |
| 5,394,196 A | * | 2/1995 | Robert | 348/699 |
| 5,418,714 A |   | 5/1995 | Sarver | 364/413.13 |
| 5,473,379 A |   | 12/1995 | Horne | 348/416 |
| 5,477,272 A |   | 12/1995 | Zhang et al. | 348/407 |
| 5,689,306 A | * | 11/1997 | Jung | 348/416 |
| 5,726,713 A | * | 3/1998 | Panis | 348/413 |
| 5,784,175 A | * | 7/1998 | Lee | 348/412 |
| 5,818,535 A | * | 10/1998 | Asnis et al. | 348/416 |

OTHER PUBLICATIONS

Netravali, A.N. and Haskell, B.G., "Digital Pictures: Representation, Compression and Standards," Second Edition, Plenum Press, 1995, pp. 309–519.

Clarke, R.J., "Digital Compression of Still Images and Video," Academic Press, 1995, 453 pages (entire edition).

* cited by examiner

*Primary Examiner*—Vu Le
(74) *Attorney, Agent, or Firm*—Blakely, Sokoloff, Taylor & Zafman, LLP

(57) ABSTRACT

A method and apparatus for pixel-by-pixel motion and/or still video data compression and decompression. Each pixel may be encoded as static, new, or direcionally estimated. Directionally estimated pixels are encoded with a value corresponding to a direction in a reduced set of substantially unique directions, wherein each direction may correspond to one or a combination of pixels. Directionally estimated pixels are further encoded using an adaptive variable length code (VLC), while static pixels and new pixels are encoded using run-lenth (RL) coding and delta coding techniques, respectively. Performance parameters, such as compression ratio, quality, etc., may be monitored to dynamically and adaptively update compression thresholds. Pixel processing may be performed in a plurality of directions to improve performance.

76 Claims, 10 Drawing Sheets

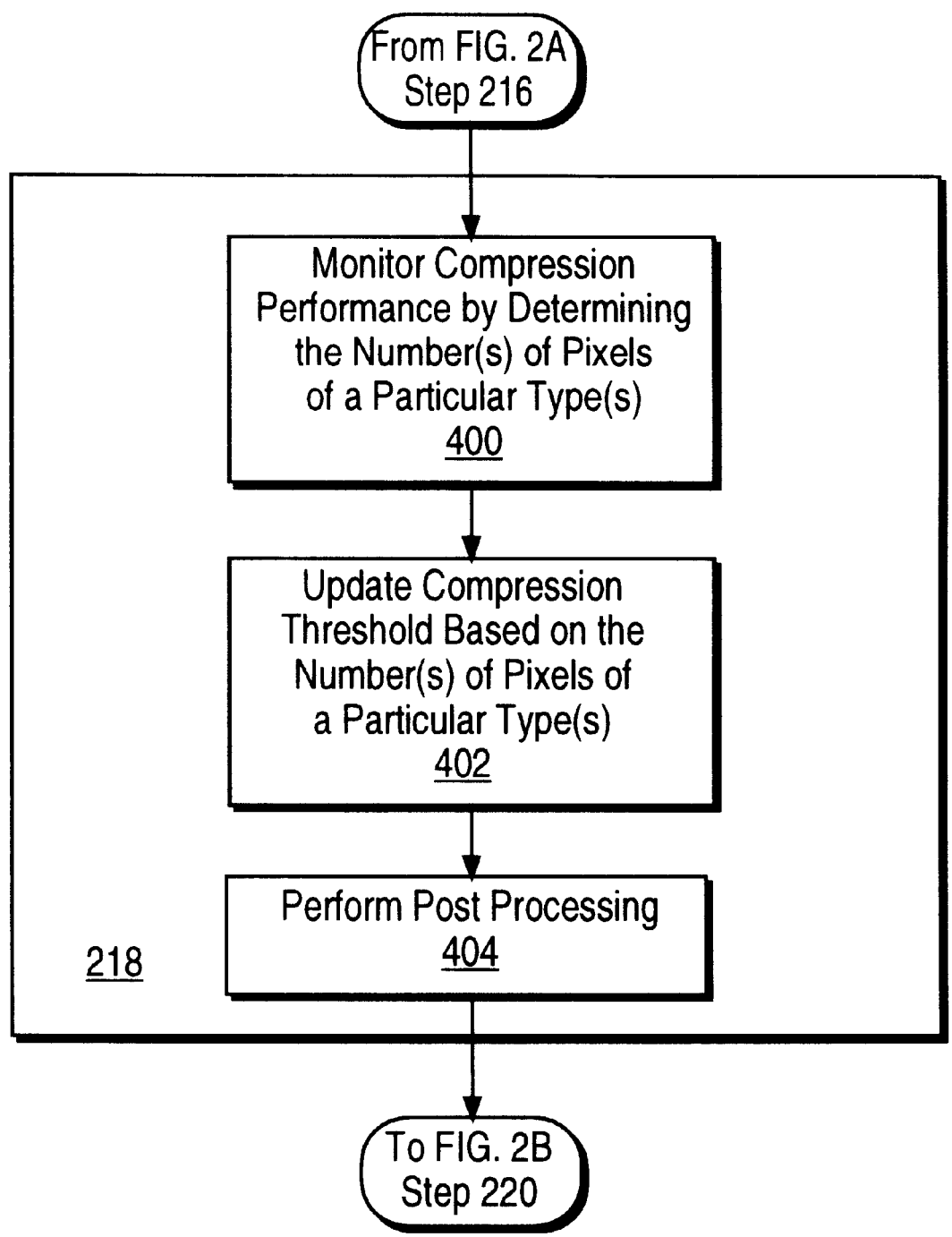

METHOD AND APPARATUS FOR COMPRESSION AND DECOMPRESSION OF STILL AND MOTION VIDEO DATA BASED ON ADAPTIVE PIXEL-BY-PIXEL PROCESSING AND ADAPTIVE VARIABLE LENGTH CODING

BACKGROUND OF THE INVENTION

1. Field of the Invention

The invention relates to the field of data compression and decompression. More specifically, the invention relates to compression and decompression of still image and/or motion video data.

2. Background Information

A frame of still or motion video typically comprises a number of frame elements referred to as pixels (e.g., a 640×480 frame comprises over 300,000 pixels). Each pixel is represented by a binary pattern that describes that pixel's characteristics (e.g., color, brightness, etc.). Motion video data usually consists of a sequence of frames that, when displayed at a particular frame rate, will appear as "real-time" motion to a human eye. Given the number of pixels in a typical frame, storing and/or transmitting data corresponding to every pixel in a frame or still or motion video data requires a relatively large amount of computer storage space and/or bandwidth. Additionally, in several motion video applications, processing and displaying a sequence of frames must be performed fast enough to provide real-time motion (typically, between 15–30 frames per second). For example, a system using a frame size of 640×480 pixels, using 24 bits to represent each pixel, and using a frame rate of 30 frames-per-second would be required to store and/or transmit over 14 megabytes of data per second.

Techniques have been developed to compress the amount of data required to represent images, making it possible for more computing systems to process video data. Compression techniques may compress video data based on either individual pixels (referred to as pixel compression) or blocks or regions of pixels (referred to as block compression) or a combination of both. Typically, pixel compression techniques are relatively easier to implement and provide higher quality than block compression techniques. Although pixel compression techniques generally provide relatively high quality and resolution for a restored image than block compression techniques, pixel compression techniques suffer from lower compression ratios (e.g., large encoding bit rates) because pixel compression techniques consider, encode, transmit, and/or store individual pixels.

One prior art block compression technique is based on compressing motion video data representing pixel information for regions (or blocks) in each frame of a motion video sequence without using information from other frames (referred to as INTRAframe or spatial compression) in the motion video frame sequence.

One type of intraframe compression involves transform coding (e.g., discrete cosine transform). Transform encoded data requires less bits to represent than original data for a frame region, and typically provides relatively high quality results. Unfortunately, transform encoding requires a relatively substantial amount of computation. Thus, transform coding is performed only when necessary (e.g., when another compression technique cannot be performed) in block compression techniques.

Another type of block compression technique typically used in conjunction with intraframe (or transform) encoding for the compression of motion video data is referred to as INTERframe or temporal compression. Typically, one or more regions (blocks) of pixels in one frame will be the same or substantially similar to regions in another frame. The primary aim of temporal compression is to eliminate the repetitive (INTRAframe) encoding and decoding of substantially unchanged regions between successive frames in a sequence of motion video frames. By reducing the amount of intraframe encoding, temporal compression generally saves a relatively large amount of data storage and computation.

When using intraframe compression in conjunction with temporal compression, the first frame in a sequence of frames is intraframe (e.g., DCT) encoded. Once encoded, the first frame becomes the "base frame" for encoding the next "new" frame (i.e., the second frame) in the sequence of frames. Thus, the frame currently being encoded is referred to as the new frame, and the frame preceding the new frame is referred to as the base (or old) frame (which is assumed to have been previously been encoded and stored).

To perform intraframe/temporal compression on a new frame, the first steps performed in nearly all temporal compression systems are frame decomposition and pixel classification. One prior art technique initially decomposes the new frame in a sequence of motion video frames into non-overlapping regions (or blocks) of a predetermined size. Next, each pixel in each region of the new frame is compared to a corresponding pixel (i.e., at the same spatial location) in the base frame to determine a "pixel type" for each pixel in the new frame. ("Corresponding" region or pixel is used herein to refer to a region or pixel in one frame, e.g., the base frame, that is in the same spatial location of a frame as a region or pixel in another frame, e.g., the new frame.) Based on a set of predetermined temporal difference thresholds, each pixel in the new frame is classified as new (non-static) or old (static).

Based primarily on the classification of pixels, it is determined if each region in the new frame is substantially similar to the corresponding region at the same spatial location in the base frame. If a region in the new frame does not contain at least a predetermined threshold number of new pixels, then that region is considered to be substantially similar to the corresponding region in the base frame and is classified as "static." Static regions are encoded by storing data indicating that the region has already been encoded as part of the base frame. The data required to indicate that a region is already encoded is substantially less than the data required to represent an uncompressed or intraframe encoded region. Thus, entire (static) regions do not need to be repeatedly intraframe encoded, stored/transmitted, and decoded, thereby saving a relatively substantial degree of computation and storage.

In addition to classifying regions as "static", temporal compression techniques typically also perform motion estimation and compensation. The principle behind motion estimation and compensation is that the best match for a region in a new frame may not be at the same spatial location in the base frame, but may be slightly shifted due to movement of the image(s) in the motion video. By determining that a region in a new frame is substantially the same as another region in the base frame within a predetermined threshold distance of the region in the base frame at the same spatial location, an indication, referred to as a motion compensation (MC) vector, can be generated to indicate the change of location of the region in the new frame relative to the base frame. Thus, a static region can be considered as an MC region with a zero-magnitude MC vector. Since the region in the base frame corresponding to the MC region in the new frame has already been encoded, stored/transmitted, and decoded, the entire MC region does not have to be repeatedly intraframe encoded, stored/transmitted, and decoded. Again, by using an indication (e.g., an MC vector) to identify in a new frame a previously encoded and stored region of a base frame that is substantially the same as a region of a new frame (but spatially displaced), repeated encoding and storage can be avoided, thereby saving a relatively substantial amount of computation and storage expense.

Thus, region(s) in the new frame in the sequence of frames may be temporally encoded if found to be similar (within a predetermined temporal difference threshold) as a region in the already encoded base frame. Once the new frame is encoded, the encoded data from the new frame is used to update the base frame, and the updated base frame then becomes the base frame for the next "new" frame in the sequence of frames as the process is repeated.

By considering regions of pixels and determining temporal differences between such regions, block compression techniques generally provide higher compression ratios than pixel compression techniques since entire regions of pixels are considered and encoded. However, block compression techniques are relatively difficult to implement and typically suffer from some loss in quality.

To achieve higher compression ratios, some pixel compression techniques designate some pixels as "elementary" pixels and use the values of the elementary pixels to encode other pixels in proximity. For example, in some television applications, such a technique is used wherein data representing the pixels in alternating even rows of a frame are transmitted and stored, while data representing the pixels in alternating odd rows of the frame are estimated using the data representing the pixels in the even rows. By predicting, rather than encoding, values for some of the rows of pixels, higher compression ratios can be achieved. However, since some pixels cannot be predicted by other pixels, such techniques generally suffer from some loss in quality with respect to a restored image and/or relatively low compression ratios.

Thus, what is desired is a video data compression technique that provides the relative ease of implementation and high quality associated with pixel compression techniques, yet provides the relatively high compression (e.g., low bit rate) that is typically associated with block compression techniques.

SUMMARY OF THE INVENTION

What is described is a method and apparatus for compression and decompression of still image and/or motion video data using pixel-by-pixel processing. According to one aspect of the invention, a non-static current pixel in a new frame is compared to each of a set of pixels and/or a combination thereof in a composite frame that may include previously processed pixels of the base frame, processed pixels from the new frame that have been "placed" into the base frame to form a composite frame (or updated/altered base frame), and/or a linear combination thereof (where the linear combinations can include the pixel in the base frame at the same spatial location as the current pixel). According to one aspect of the invention, the set of pixels correspond to an initial set of directions that is then reduced to obtain a reduced set of directions, which includes substantially uniques directions. Based on the comparison, if the current pixel is found to be similar within a threshold to a direction in the reduced set of directions, the current pixel is encoded as directionally estimated. If the current pixel cannot be encoded as static or directionally estimated, then the pixel is encoded as "new" using a delta value that is based on the difference between the current pixel and a reference pixel (e.g., the corresponding pixel at the same spatial location in the base frame, a pixel in proximity to that corresponding pixel, etc.).

According to yet another aspect of the invention, a method and apparatus is described wherein directionally encoded/estimated pixels in a still image and/or a frame of motion video are encoded using an adaptive variable length code (VLC). In one embodiment, a set of Huffman codes is stored and an optimum Huffman code is selected to encode a pixel based on a Huffman code used to encode other pixels in the frame. Thus, more than one VLC may be used to encode pixels in a frame of still or motion video. In another embodiment, VLCs (e.g., Huffman codes) are adaptively generated "on the fly" for further encoding directionally encoded pixels in a frame. Either or both the number of states and/or statistics associated with the VLCs may be adaptively generated for each or a set of pixels in a frame.

According to another aspect of the invention, compression thresholds and/or pixel processing algorithms are adaptively updated to avoid an unacceptable degradation in performance (e.g., processing time, compression ratio, quality of a restored image, etc.). For example, in certain embodiments of the invention wherein a desired performance parameter is providing a relatively high compression ratio, the threshold used to determine whether the current pixel can be encoded as static is adaptively updated based on the number of static and/or new pixels processed in the new frame. As another example, in certain embodiments of the invention certain pixels are automatically classified (e.g., directionally estimated using a default direction without comparison to other pixels; classified as static or new based on a single comparison; etc.), based on the number of static, estimated, and/or new pixels processed in the new frame.

According to yet another aspect of the invention, the direction in which pixels are processed (e.g., placed into the base frame to form an altered base frame) is varied to provide relatively symmetrical processing of pixels which generally results in an improved compression ratio and/or quality of restored images.

According to yet another aspect of the invention, a method and apparatus is described for decompression of motion video data that has been encoded according to the invention.

BRIEF DESCRIPTION OF THE DRAWINGS

The invention may best be understood by referring to the following description and accompanying drawings which illustrate embodiments of the invention. In the drawings:

FIG. 4 is a flow diagram illustrating adaptive updating of compression thresholds (step 218 of FIG. 2A) according to one embodiment of the invention.

DETAILED DESCRIPTION

Figure 1:
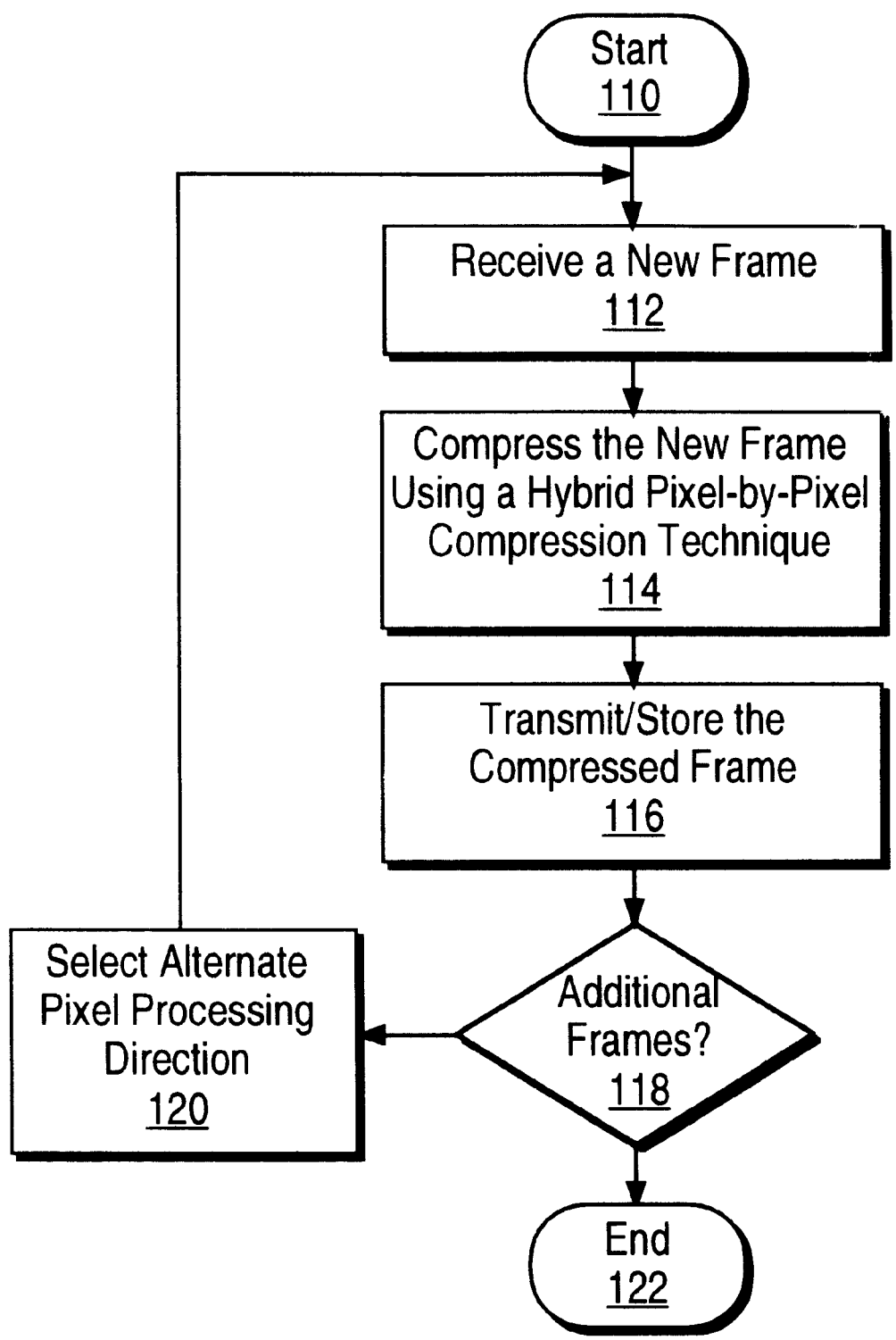
FIG. 1 is a flow diagram illustrating an overview of a method for compressing motion video data according to one embodiment of the invention.

In the following description, numerous specific details are set forth to provide a thorough understanding of the invention. However, it is understood that the invention may be practiced without these specific details. In other instances, well-known circuits, structures and techniques have not been shown in detail in order not to obscure the invention.

I. Overview of the Invention

A method and apparatus is described for the compression and decompression of still image and motion video data using pixel-by-pixel processing. According to one aspect of the invention, a current pixel in a new frame of a motion video sequence is compared to a corresponding pixel at the same spatial location in a previously processed base frame. Based on the comparison, if the current pixel is found to be similar to the corresponding pixel in the base frame within a threshold, the current pixel is encoded as static.

If the current pixel is not similar to the corresponding pixel according to the threshold, the current pixel is compared to each of a set of pixels and/or a combination thereof in the base frame. The set of pixels may include previously processed pixels of the base frame, processed pixels from the new frame that have been "placed" into the base frame to form a composite frame (or updated/altered base frame), and/or a linear combination thereof (where the linear combinations can include the pixel in the base frame at the same spatial location as the current pixel). Based on the comparison, if the current pixel is found to be similar within a threshold to one of the set of pixels or a combination thereof, the current pixel is encoded as directionally estimated. If the current pixel cannot be encoded as static or directionally estimated, then the pixel is encoded as "new" using a delta value that is based on the difference between the current pixel and a reference pixel (e.g., the corresponding pixel at the same spatial location in the base frame, a pixel in proximity to that corresponding pixel, etc.). Typically, the greater the number of pixels in an image that are classified as non-static (e.g., classified new or "directionally estimated"), the more processing and storage required to compress that image.

According to another aspect of the invention, compression thresholds and/or pixel processing algorithms are adaptively updated to avoid an unacceptable degradation in performance (e.g., processing time, compression ratio, quality of a restored image, etc.). For example, in certain embodiments of the invention wherein a desired performance parameter is providing a relatively high compression ratio, the threshold used to determine whether the current pixel can be encoded as static is adaptively updated based on the number of static and/or new pixels processed in the new frame. As another example, in certain embodiments of the invention certain pixels are automatically classified (e.g., directionally estimated using a default direction without comparison to other pixels; classified as static or new based on a single comparison; etc.), based on the number of static, estimated, and/or new pixels processed in the new frame.

According to yet another aspect of the invention, the direction in which pixels are processed (e.g., placed into the base frame to form an altered base frame) is varied to provide relatively symmetrical processing of pixels which generally results in an improved compression ratio and/or quality of restored images.

According to yet another aspect of the invention, a method and apparatus is described wherein directionally encoded/estimated pixels in a still image and/or a frame of motion video are encoded using an adaptive variable length code (VLC). In one embodiment, a set of Huffman codes is stored and an optimum Huffman code is selected to encode a pixel based on a Huffman code used to encode other pixels in the frame. Thus, more than one VLC may be used to encode pixels in a frame of still or motion video. In another embodiment, VLCs (e.g., Huffman codes) are adaptively generated "on the fly" for further encoding directionally encoded pixels in a frame. Either or both the number of states and/or statistics associated with the VLCs may be adaptively generated for each or a set of pixels in a frame. By selecting and/or generating an optimum VLC, such as a Huffman code, for various sets of pixels in a still image or frame of motion video, compression ratios are improved.

According to yet another aspect of the invention, a method and apparatus is described for decompression of motion video data that has been encoded according to the invention.

Other features and benefits of the invention will be apparent from the figures and detailed description of the invention which follow. It should become apparent that several aspects of the invention could be implemented in still image and/or motion video applications. Furthermore, it should be appreciated that the invention can be implemented in any number of ways, including hard-wired circuitry, software instructions, or any combination thereof.

II. Compression

FIG. 1 is a flow diagram illustrating an overview of a method for compressing motion video data according to one embodiment of the invention. Flow begins at step 110 and ends at step 122. From step 110, flow passes to step 112. In step 112, a new frame of a motion video sequence is received, and flow passes to step 114. The motion video frame may be received from any number of sources, such as a video camera, computer-generated animation, a storage medium, etc.

In step 114, the pixel data is compressed using a hybrid pixel-by-pixel compression technique. Each pixel in the new frame is encoded as new, directionally estimated, or static. A map of directions and a map of differences (indicating values of "new" pixels) are generated, indicating values for estimating each pixel in the new frame. The directionally estimated pixels of the new frame are further encoded using an adaptive variable length code (VLC). In one embodiment of the invention, a set of at least eight Huffman codes is stored, and an optimum Huffman code is selected for each pixel and used for further encoding directionally that pixel. In one embodiment, Huffman codes in the set of Huffman codes differ by the number of states and/or the statistics assigned to each state. As will be described below, the states and/or the statistics of the set of Huffman codes can be adaptively determined for each or a set of pixels in each frame in the sequence of motion video frames. Exemplary methods for processing pixels in the new frame are described with reference to FIGS. 2A–B and 3A–C. Additionally, compression thresholds may be adaptively updated in step 114, as will be described in further detail with reference to FIG. 4.

In step 116, a bit stream is formed and output. The output bit stream may be stored, transmitted, decompressed, etc. From step 116, flow passes to step 118.

In step 118, if additional frames need to be processed, control passes to step 120. Otherwise, flow passes to step 122 and ends. In step 120, an alternative direction in which the pixels are processed is selected for the next frame and control passes back to step 112. Step 120 will be further described with reference to FIGS. 5A–5C.

Although FIG. 1 represents one embodiment of the invention for directional estimation/encoding of pixel data representing motion video, it will become apparent from the description that follows that the invention may be implemented for the compression of still image pixel data as well.

A. Hybrid Pixel-by-pixel Directional Estimation

Figure 2A:
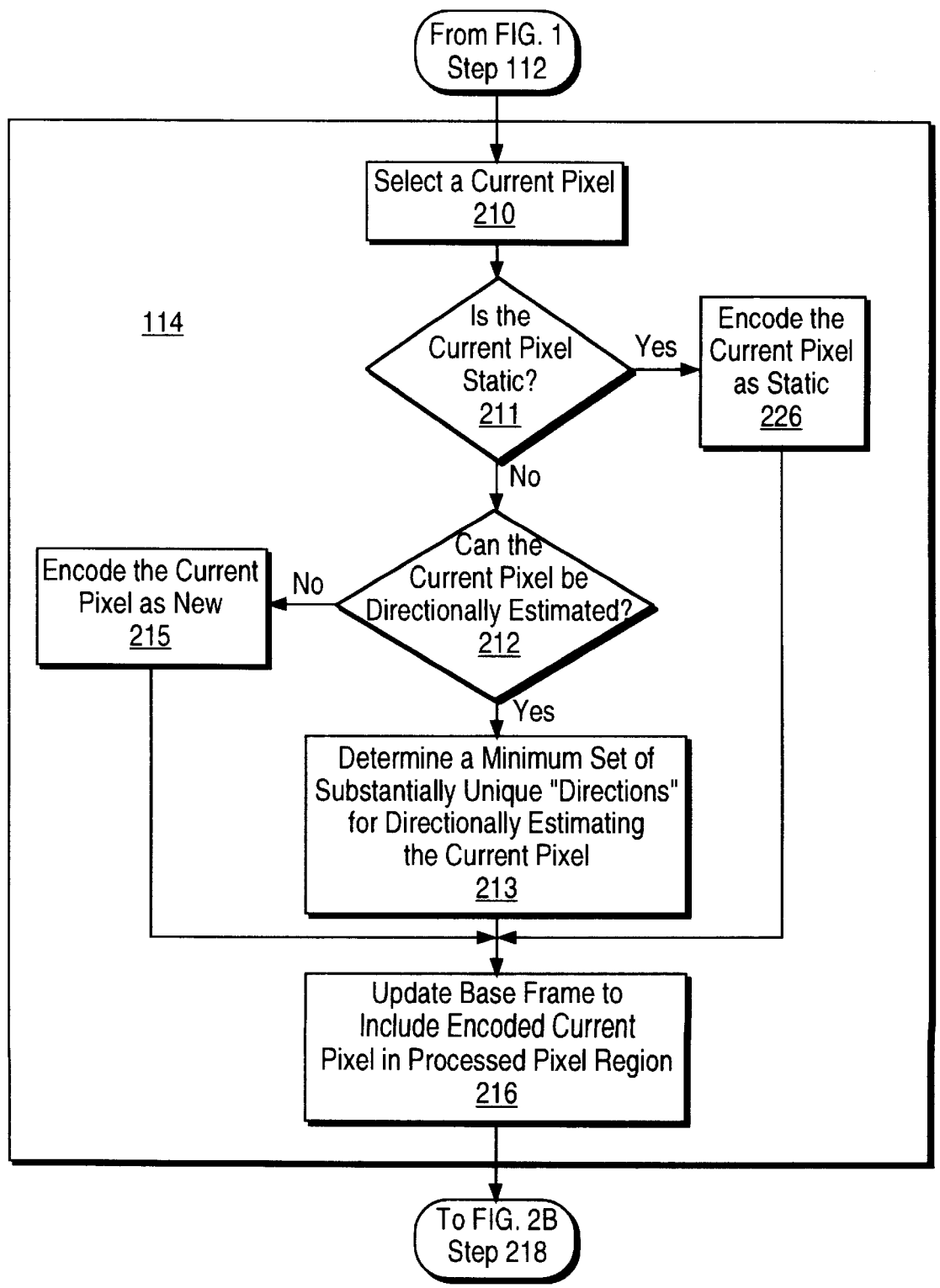
FIG. 2A is part of a flow diagram of a method for performing step 114 from FIG. 1 according to one embodiment of the invention.
Figure 2B:
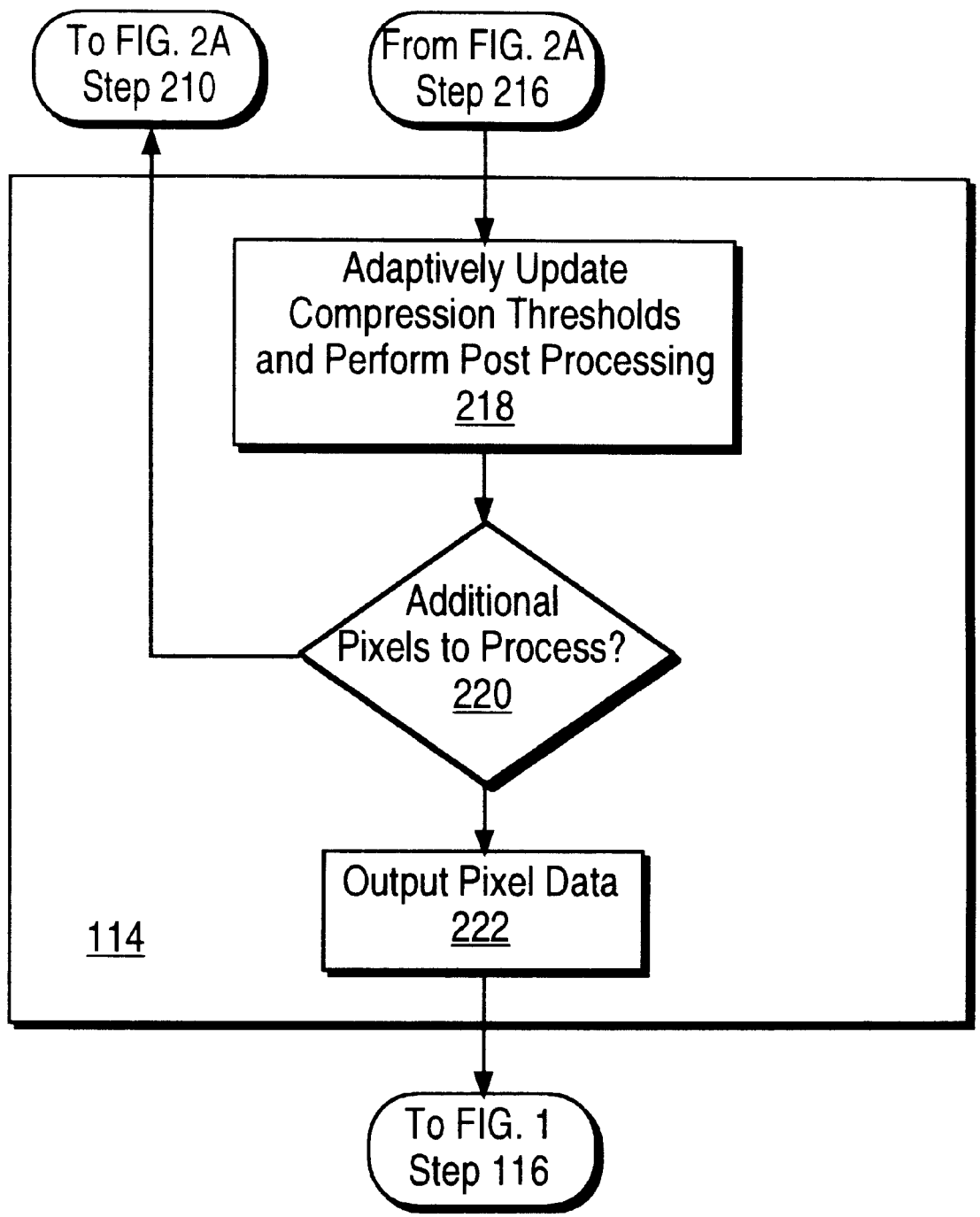
FIG. 2B is the remainder of the flow diagram shown in FIG. 2A.
Figure 3A:
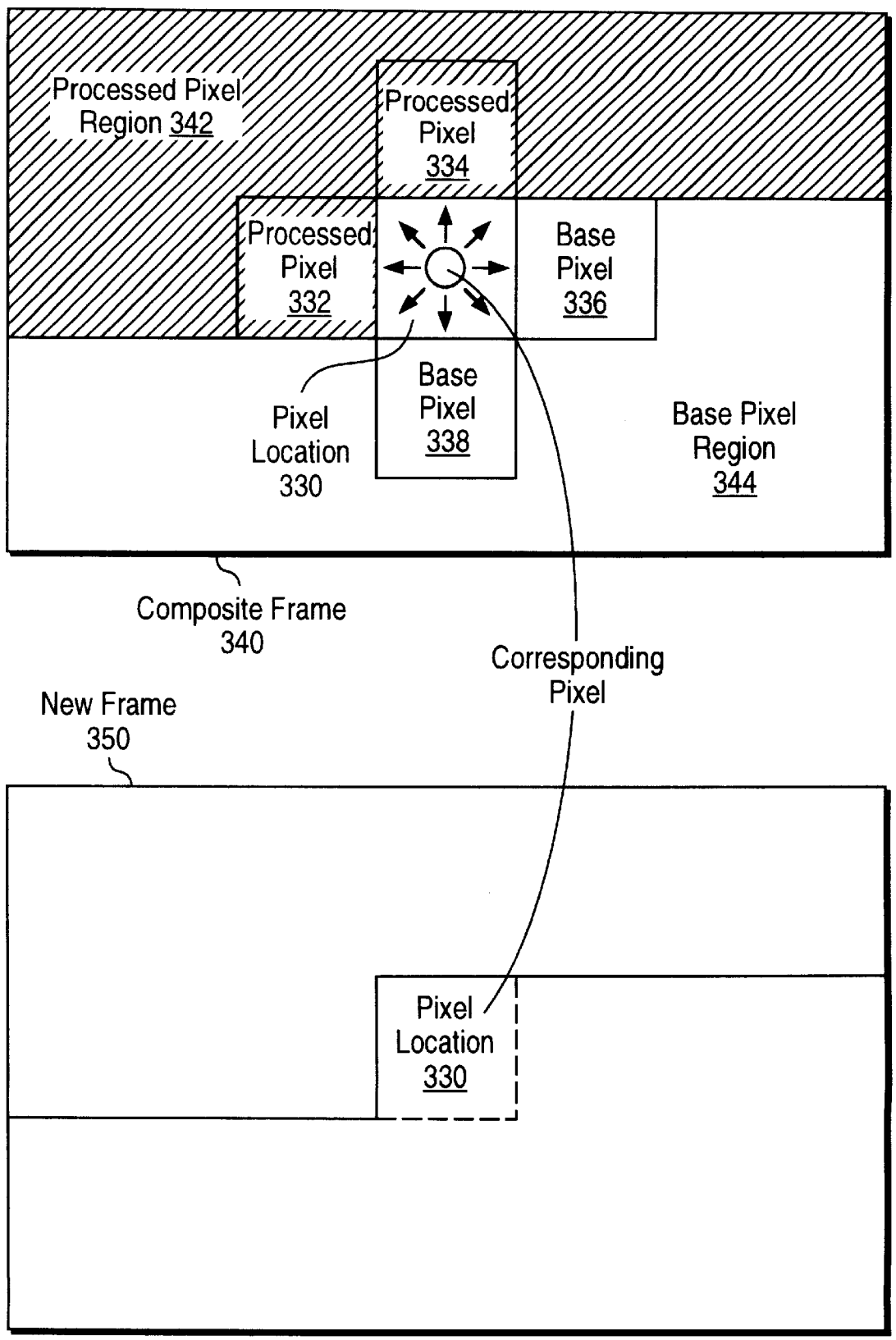
FIG. 3A is a block diagram illustrating an example of hybrid pixel-by-pixel processing according to one embodiment of the invention
Figure 3B:
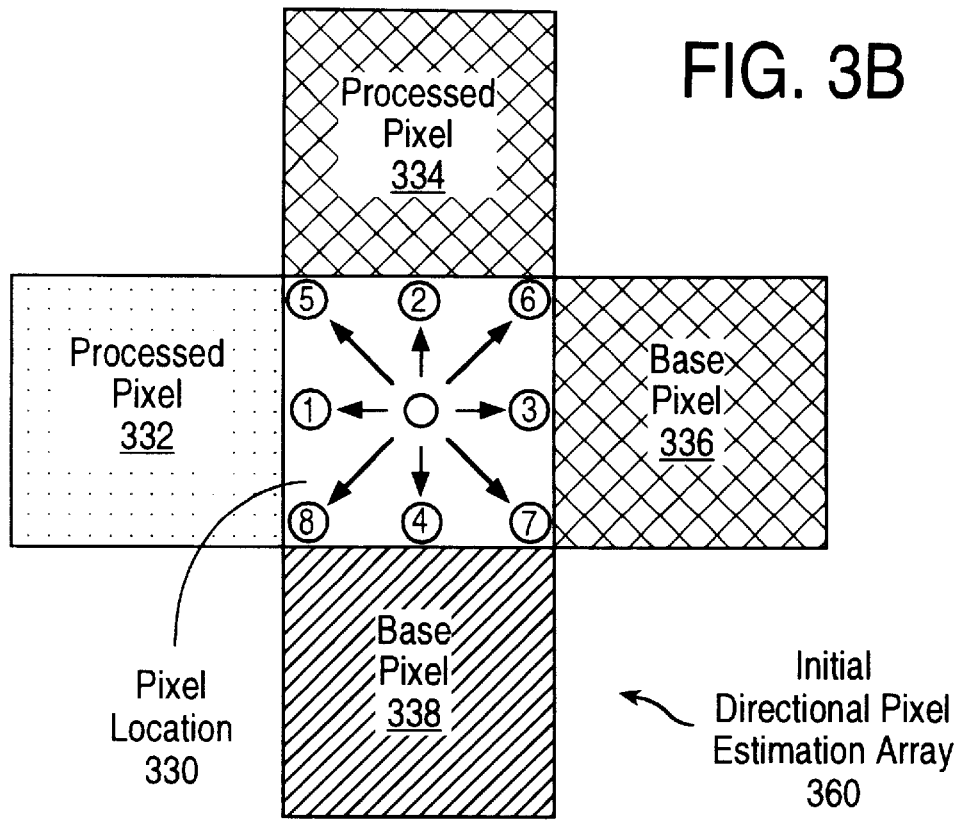
FIG. 3B is a block diagram illustrating part of a method for reducing an initial set of directions used to estimate a current pixel in a new frame of motion video according to one embodiment of the invention.
Figure 3C:
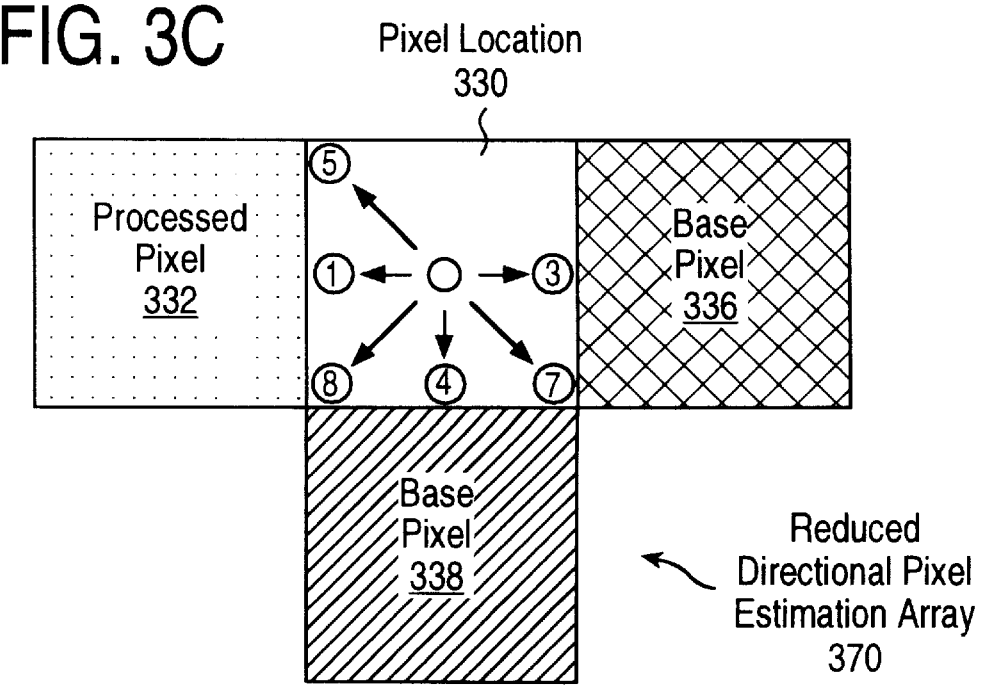
FIG. 3C is a block diagram illustrating the remainder of the method from FIG. 3B.

FIGS. 2A and 2B illustrate a flow diagram of a method for performing step 114 from FIG. 1 according to one embodiment of the invention, while FIGS. 3A–C are block diagrams illustrating an example of hybrid pixel-by-pixel processing according to one embodiment of the invention. FIGS. 2A and 2B are described with reference to FIGS. 3A–C to aid in the understanding of the invention.

From step 112, flow passes to step 210. In step 210, a current pixel in the new frame is selected, and flow passes to step 211. In one embodiment, pixels are selected and processed from left to right along each row beginning at the top row.

With reference to the example shown in FIG. 3A, a composite frame 340 and a new frame 350 are shown. The new frame 350 includes a pixel location 330 which corresponds to the current pixel selected in step 210. The pixel location 330 is also shown in the composite frame 340. The composite frame 340 represents a base frame (i.e., a frame that has been previously processed and stored, and typically precedes the new frame 350 in a motion video sequence) that is altered "on the fly" as pixels in the new frame 350 are processed. Thus, the composite frame 340 is an altered or updated base frame that includes pixels from the base frame, as well as processed (encoded) pixels from the new frame 350. As such, the composite video frame 340 includes a processed pixel region 342, which represents processed pixels from the new frame that have been encoded and incorporated into the base frame. Furthermore, the composite frame 340 includes a base pixel region 344 that represents pixels of the base frame.

Since FIGS. 3A–C illustrate an example wherein pixels in the new frame 350 are processed from left to right and top to bottom, the processed pixel region 342 includes pixels that are above and to the left of the pixel location 330, while the base pixel region 344 includes pixels below and to the right of the pixel location 330.

In step 211 of FIGS. 2A–B, it is determined if the current pixel is static. If the current pixel is static, control passes to step 226. Otherwise control passes to step 222. With reference to FIG. 3A, if the base pixel at the pixel location 330 in the composite frame 340 is similar based on a predetermined compression threshold to the current pixel at the same location in the new frame 350, then the current pixel is classified as static (e.g., direction 0) and control passes to step 226. In step 226, the static pixel is further encoded using a run length (RL) code. While one embodiment is described in which static pixels are further encoded using a RL code, alternative embodiments need not further encode or may further encode using any number of different codes.

In contrast, if the current pixel is not static, control passes from step 211 to step 212. In step 212, the current pixel is compared to a set of pixels (and/or a combination thereof) in the composite frame to determine if the current pixel can be directionally estimated. From step 212, control passes to step 213.

With reference to FIG. 3A, the current pixel in the new frame 350 is compared to pixels in the composite frame 340 adjacent to pixel location 330 (referred to as adjacent pixels), including a processed pixel 332, a processed pixel 334, a base pixel 336, and a base pixel 338. In the described embodiment, the current pixel may also be compared to linear combinations of the adjacent pixels and/or the corresponding pixel, such as the combination of the processed pixel 332 and the processed pixel 334, the combination of the processed pixel 334 and the base pixel 336, processed pixel 332 and the base pixel at the pixel location 330 of the composite frame 340, etc. Thus, the pixels 332, 334, 336, and 338, as well as the base pixel at the pixel location 330 in the composite frame 340, and combinations thereof can be considered as "directions" for estimating the current pixel at the pixel location 330 in the new frame 350. Each direction is assigned a value which may be used as an indication to encode the current pixel.

To illustrate, TABLE 1 shows an example of values (directional values) corresponding to "directions" for directionally estimating the current pixel at the pixel location 330 in the new frame 350, having spatial coordinates [i,j], where i corresponds to row numbers and j corresponds to column numbers, BP refers to base pixels in the base pixel region 344, and PP refers to processed pixels in the processed pixel region 342. For example, the processed pixel 334 is denoted as PP[i,j−1], which is assigned the value 1, while 0.5*(PP[i,j−1]+PP[i−1, j]) corresponds to a linear combination of the processed pixel 332 and the processed pixel 334 and is assigned the value 5. As previously described, if the current pixel at the pixel location 330 is similar to the corresponding base pixel at the pixel location 330 (denoted by BP[i,j]) in the composite frame 340, then the current pixel will be classified as static and encoded with value zero. Thus, static pixels may be regarded as a special case and/or as directionally estimated with the directional value of zero. Furthermore, alternative embodiments of the invention may use BP[i,j] in combinations of pixels used to classify/encode the current pixel.

TABLE 1

| Directional Predictor | Value Corresponding to Direction |
| --- | --- |
| BP[i,j] (current pixel is static) | 0 |
| PP[i,j − 1] | 1 |
| PP[i − 1,j] | 2 |
| BP[i,j + 1] | 3 |

TABLE 1-continued

| Directional Predictor | Value Corresponding to Direction |
|---|---|
| BP[i + 1,j] | 4 |
| 0.5 * (PP[i,j − 1] + PP[i − 1,j]) | 5 |
| 0.5 * (PP[i − 1,j] + BP[i,j + 1]) | 6 |
| 0.5 * (BP[i,j + 1] + BP[i + 1,j]) | 7 |
| 0.5 * (BP[i + 1,j] + PP[i,j − 1]) | 8 |
| new pixel | −1 |

In the described embodiment, the optimum direction for estimating the current pixel is determined by finding the smallest average difference of Y, U, V color characteristics between the current pixel and each pixel and/or combinations of pixels in the set of pixels in composite frame. If the smallest difference is below a threshold for encoding the current pixel, then the current pixel can be directionally estimated and control passes to step 213. Otherwise, control passes to step 215.

In the described embodiment, the initial set of directions that may be used to directionally estimate the current pixel in the new (current) frame includes the "directions" numbered 1–8 in TABLE 1. In step 213, the initial set of directions for estimating the current pixel is reduced, if possible, to eliminate redundant directions (i.e., directions that are substantially the same, and thus, would result in substantially the same estimation of the current pixel). From step 213 control passes to step 214. We now turn to FIGS. 3B and 3C to illustrate the reduction of the set of directions used to estimate the current pixel. It should be appreciated that in alternative embodiments wherein pixels of a still image are processed, a base frame would not exist, and thus, "directions" corresponding to the values 0, 3, 4, 6, 7, and 8 would not be used.

While one embodiment has been described wherein the classification of static, new, and directionally estimated pixels is treated separately (i.e., performing step 211, 215, and 212 separately), it should be understood that alternative embodiments of the invention may perform any combination of steps 211, 212, 226, and 215 as one step, since static pixels and new pixels may be identified by a directional value as shown in TABLE 1. Furthermore, steps 211, 212, 213, and 215 may be performed in any number of sequences. For example, step 213—the reduction of the sets of directions—may be performed immediately after step 210, and prior to the classification of the current pixel. As will become apparent from the description that follows, performing step 213 prior to step 212 (which may be altered to include any of combination of steps 211, 215, and/or 226) may be especially suitable for embodiments wherein variable length codes are adaptively generated for sets of pixels in a frame, especially when the pixel classification and adaptive variable length code generation are performed "on the fly".

FIGS. 3B and 3C illustrate a method for reducing an initial set of directions used to estimate a current pixel in a new frame of motion video according to one embodiment of the invention. FIG. 3B shows an initial directional pixel estimation array ("initial array") 360, and FIG. 3C shows a reduced directional pixel estimation array ("reduced array") 370. The initial array 360 includes an initial set of directions that may be used to estimate the current pixel at the pixel location 330 in the new frame 350, as described above with reference to FIG. 3A and exemplified in TABLE 1. Thus, the initial array 360 includes the processed pixel 334, the base pixel 336, the base pixel 338, and the processed pixel 332. The shading patterns in the processed pixel 334, the base pixel 336, the base pixel 338, and the processed pixel 332 are meant only to illustrate any number of types of pixel characteristics, such as Y, U, and/or V components. For illustrative purposes, values corresponding to the directions of the processed pixel 334, the base pixel 336, the base pixel 338, the processed pixel 332, as well as combinations thereof, which may be used to estimate the current pixel, are shown with arrows in the initial array 360.

The reduced array 370 represents unique directions for estimating the current pixel at the pixel location 330 in the new frame 350. Since the shading of the pixel 334 and the base pixel 336 are the same in the initial array 360, the same result will be obtained by estimating the current pixel with any one of the directions designated by the values 2, 6, and 3 shown in the initial array 360. Thus, in the reduced array 370, the directions 2 and 6 have been eliminated from the possible set of directions for estimating the current pixel at the pixel location 330 in the new frame 350. It should be appreciated that any combination of the redundant directions designated by the values 2, 6, and 3 could be eliminated to form the reduced array 370. As will become apparent from the description that follows, by reducing the number of directions that may be used to estimate a pixel, the invention achieves a higher compression ratio. While one embodiment is described in which the set of directions is reduced to remove redundancies, alternative embodiments need not reduce the number of directions.

As will become apparent from the description below of the adaptive variable length coding (VLC), reducing the initial set of directions used to estimate each pixel substantially improves compression ratio associated with VLC codewords. To illustrate, suppose that the initial directional set of TABLE 1, which includes eight directions, is not reduced. In this case, to encode all ten directions illustrated in TABLE 1, at least four bits would be necessary to identify each direction. For example, direction 0 could be encoded by the binary word 0000, direction 1 could be encoded by 0001, and so on. Thus, if X equals the total number of pixels in a frame to encode, a bit stream of length 4*X would need to be generated if the intial direction set of ten directions is not reduced.

Now, consider the case where the initial set of directions is reduced to substantially unique directions, such as illustrated in FIGS. 3B and 3C. For purposes of illustration, assume that half of the number of pixels (or 0.5*X pixels) each have a corresponding reduced set of directions that is comprised of three substantially unique directions (e.g., direction 0, direction 1, and direction 2) and the direction −1, corresponding to a new pixel value. To encode those pixels having a reduced set of directions including four states (the three unique directions and the new pixel direction −1), only two bits are necessary. For example, direction 0 is encoded by the binary sequence 00, direction 1 is encoded by 01, direction 2 is encoded by 10, and direction −1 is encoded by 11. Thus, the length of the bit stream for encoding all of the pixels X would be decreased to 4*(0.5*X)+2*(0.5*X) or 3*X, thereby improving the compression ratio by 25% relative to the example above wherein the initial set of ten directions is used to encode all X pixels. It should further be note that in the described embodiment, the directions that remain in the reduced set of directions for each pixel may be renumbered (for example, if the reduced set of directions is comprised of directions 3, 7, 8, those directions may be renumbered as 0, 1, 2). However, renumbering of the directions in the reduced set of directions is not necessary in alternative embodiments of the invention.

It should be also appreciated that in several embodiments of the invention wherein motion video data is encoded and decoded, information about reduced sets of directions is available to the decoder, as well as the encoder, without the need for the encoder to send such information to the decoder. Since both the decoder and encoder store a base frame, the decoder can determine and renumber a reduced set of directions in the same manner as the encoder, thereby eliminating the need for the encoder to transmit additional information about the reduced set of directions.

In step 213 the current pixel is directionally estimated using an indication corresponding to the optimum direction included in the reduced set of directions, and flow passes to step 216. In one embodiment of the invention, the directionally estimated pixel information is further encoded using an adaptively selected variable length code (VLC). In the described embodiment, Huffman codes are used. One of a set of Huffman codes is selected depending on the number of possible states for encoding the pixels, which in turn, corresponds to the number of directions in the reduced set of directions that are used to estimate pixels. To illustrate, TABLE 2 shows the dependence of the VLCs (e.g., Huffman codes) on the number of directions in the reduced set of directions that may be used to estimate a pixel.

TABLE 2

| Number of Directions in Initial Set of Directions | Number of Directions in Reduced Set of Directions | Number of States in Selected Variable Length Code (VLC) |
|---|---|---|
| 8 | 8 | 8 |
| 8 | 7 | 7 |
| 8 | 6 | 6 |
| 8 | 5 | 5 |
| 8 | 4 | 4 |
| 8 | 3 | 3 |
| 8 | 2 | 2 |
| 8 | 1 | 1 |

It is well known that the bit length of each codeword of a VLC depends on the number of possible states that may be coded, as well the statistical information about those states. Thus, by reducing the number of directions that may be used to estimates a pixel to form a reduced set of directions (as described above with reference to FIGS. 3B and 3C), the invention allows optimization of the VLC (by minimizing the average bit length) used to further encode pixel estimation data, as shown by TABLE 2. In an alternative embodiment, statistics associated with each direction in the reduced set of directions, and in turn, the states of the VLCs, are dynamically determined for sets of pixels based on the statistics associated with the directions in the reduced set of directions. For example, in one embodiment, after statistics of a Huffman code determined for encoding pixel data for a first line of a frame, the Huffman code for the next line is selected based on the statistics of the Huffman code for the first line.

Once an optimum code (e.g., a VLC with a minimized number of states and/or dynamically optimized statistics for each state) is determined and selected for encoding the directional pixel estimation data, the directional pixel estimation data is encoded using the optimum code.

While one embodiment is described in which pixel classification (first stage compression) and further encoding (second stage compression using RL and/or VLC coding) is performed "on the fly" (i.e., for each pixel as it is processed), alternative embodiments perform first stage compression for a set of pixels (e.g., a particular number, a row, a frame, etc.) prior to performing second stage compression. In either type of embodiment, a set of VLCs (e.g., Huffman codes) are constructed and stored as each pixel or a set of pixels (e.g., a line in a frame) is processed in a still image or motion video frame. As other pixels in the frame are processed, additional VLCs may be constructed and/or selected based on new statistics and/or the statistics associated with the previously processed pixels in the frame. For example, in one embodiment, a VLC for a i-th row is constructed and/or selected based on the statistics (of directions) of the i−1 row. It should be appreciated that in such embodiments, the information regarding which VLC (e.g., Huffman code) has been used is independently available to the encoder and the decoder, and thus, additional data does not need to be generated and output to identify a particular VLC that has been used to further encode pixel directional estimation data.

It should be understood that the invention may be practiced in a number of alternative embodiments wherein more than one VLC (e.g., Huffman code) is used to encode pixels of a frame of still image or motion video. However, while one embodiment has been described wherein adaptive variable length coding is performed for encoding pixels in still and/or motion video frames, alternative embodiments do not necessarily use more than one VLC to encode the pixel data. Furthermore, any number of alternative coding techniques may be used to encode the directional pixel estimation data.

In step 215, the current pixel is encoded as a new pixel (denoted as direction −1 in one embodiment of the invention) and control passes to step 216. In one embodiment, new pixels (e.g., pixels that are not static and cannot be directionally estimated) in the new/current frame are compressed using a delta value that represents the difference between a reference pixel and the new pixel. In the described embodiment, a new pixel NP[i,j] in the current frame is encoded using a delta value that is equal to NP[i,j] minus BP[i,j−1]. Furthermore, in the described embodiment, the delta value is bound by a threshold of 120 of the Y color component, and 56 for the U and V components. The delta value is divided by an integer (8 in the described embodiment) and the resulting integer value is used to encode the current pixel as new. In alternative embodiments, BP[i,j] and/or any set of pixels and/or combinations thereof may be used to determine the delta value for estimating the new pixel. Furthermore, any number of pixel characteristics and threshold values for such characteristics may be used to encode a pixel as new.

However, it should be appreciated that alternative embodiments of the invention do not necessarily encode data representing a new pixel. Furthermore, any number of techniques other than delta value encoding may be used for encoding a new pixel.

In step 216, the base frame is updated to include data representing the processed current pixel, and flow passes to step 218. For example, if the new frame is processed in the manner described with reference to FIG. 2B (i.e., from left to right and from top to bottom), the processed pixel region 342 will be updated to include the current pixel in step 216.

In step 218, adaptive compression thresholds are updated, and flow passes to step 220. Exemplary techniques for adaptively updating compression thresholds will be described below with reference to FIG. 4. Additionally, it will become apparent from the description of FIG. 4 that alternative embodiments of the invention may perform step 218 after all of the pixels have been processed (e.g., after all of the pixels in the current frame have been processed) and/or at any time before all of the pixels in the current frame have been processed.

In step 220, if additional pixels in the new frame require processing, flow returns to step 210 wherein another pixel is selected as the current pixel. Otherwise, flow passes to step 222.

In step 222, the pixel data is output, and flow passes to step 116. In the described embodiment, the first pixel (e.g. in the first frame and/or each new frame of a motion video sequence) that is selected as a current pixel is not processed by a direction, but is included in the output data without encoding. In addition, while one embodiment is described in which static pixels are treated as a special case (e.g., step 211) to avoid performing unnecessary processing, alternative embodiments perform 211 as part of step 212.

B. Adaptive Determination of Compression Thresholds

FIG. 4 is a flow diagram illustrating adaptive updating of compression thresholds (step 218 of FIG. 2A) according to one embodiment of the invention. In FIG. 4, flow passes from step 216 to step 400.

In step 400, as each pixel in a video frame is processed, the performance of the compression technique is monitored by tracking one or more of the number of pixels classified as static, directionally estimated, and new. From step 400, flow passes to step 402. Static pixels typically require a relatively small number of bits to encode, new pixels typically require a relatively large number of bits to encode, and directionally estimated pixels generally fall somewhere in between. In addition, a relatively large amount of processing (e.g., pixel comparisons) is typically required to directionally estimate a pixel.

In step 402, pixel compression thresholds are updated based on the number of pixels determined in step 400, and flow passes to step 404. Pixel compression thresholds may be updated to improve performance in any number of ways (e.g., decrease processing time, improve compression ratios, improve quality of a restored image, etc.). In one exemplary embodiment, if the number of static pixels is above or below a threshold, then the threshold used to determine if a pixel is static is altered accordingly. For example, if a high compression ratio is desired and more than a threshold number of pixels have been classified as non-static, then the threshold that determines if a current pixel should be classified as static is adjusted such that the probability that a pixel will be classified as static increases. Although quality may decrease by such an adjustment, the compression ratio will typically improve since static pixels typically require the least amount of bits to encode. In addition or alternatively, the number of new and/or directionally estimated pixels may be monitored to update a compression threshold(s) to improve performance in any number of ways.

In addition to or alternatively to the adjustment of threshold(s), performance can be improved by: 1) streamlining the steps required to classify all or only "selected pixels" (e.g., selected pixels can include every other pixel, two of every three pixels, one of every three pixels, an entire row of pixels, etc.); and/or 2) classifying all or only the selected pixels using pixel classifications that result in a higher compression ratio. The steps required to classify a pixel can be streamlined any number of ways. For example, the steps used to classify a pixel can be reduced by only performing the comparisons required to classify that pixel as static. If the pixel is not static, then that pixel is given a default classification without performing additional comparisons—e.g., automatically classified as new, automatically directionally estimated using a default direction, etc. As yet another example, each selected pixel may be given a default classification (such as static, a particular default direction, etc.) without performing any comparisons. The compression ratio can be improved by only classifying all pixels and/or the selected pixels as: 1) static; and/or 2) directionally estimated using a sufficiently reduced set of directions.

In step 404, additional (post) processing is performed before and/or after all of the pixels in the new frame are processed (i.e., before or after step 220). One example of such post processing involves reclassifying a set or sets of non-static pixels in the frame as static, especially in cases where the non-static pixels are in proximity to static pixels. This process allows more efficient compression, especially in an embodiment wherein sequences of static pixels are further encoded using run-length (RL) encoding. This reclassification of pixels is particularly suited for the previously described alternative embodiments that perform first stage compression (pixel classification) for a set of pixels (e.g., a particular number, a row, a frame, etc.) prior to performing second stage compression (further encoding using RL coding, VLC coding, etc.), rather then performing first and second stage compression "on the fly" (i.e., for each pixel as it is processed).

It should be appreciated that the steps of adaptively updating compression thresholds and performing post-processing can be performed in a number of ways, at least in part depending on the particular performance parameter (e.g., processing time, compression ratio, quality, etc.) that is to be improved. It should further be appreciated that while one embodiment has been described wherein compression thresholds are adaptively updated and post processing is performed, alternative embodiments do not necessarily perform adaptive compression threshold updating and/or post processing. Additionally, adaptive updating of compression thresholds and/or post processing may be performed at any time during and/or after processing of a frame.

C. Multidirectional Pixel Processing

Figure 5A:
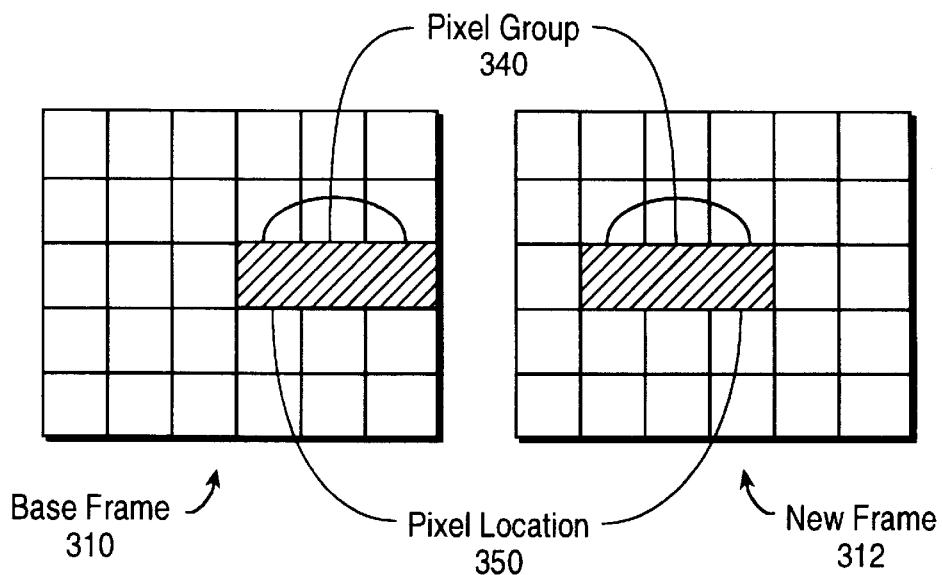
FIG. 5A is a block diagram illustrating an exemplary base and new frames used to illustrate the principle behind multi-directional pixel processing (step 120 from FIG. 1) according to one embodiment of the invention.
Figure 5B:
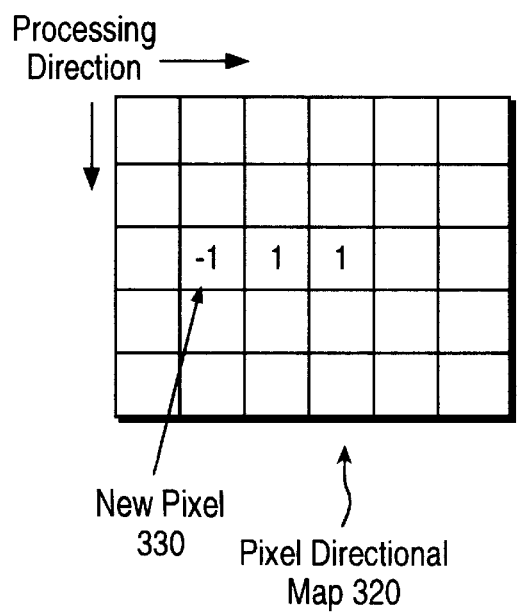
FIG. 5B is a block diagram illustrating a pixel directional map 320 generated using the directional pixel prediction technique described with reference to FIGS. 2A–B according to one embodiment of the invention.
Figure 5C:
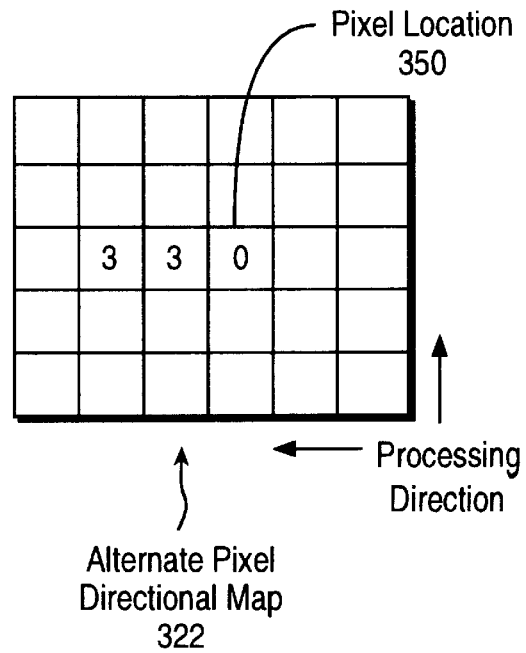
FIG. 5C is a block diagram illustrating an alternative pixel directional map 322 generated using the directional pixel prediction technique described with reference to FIGS. 2A–B according to one embodiment of the invention.

FIGS. 5A–C are block diagrams illustrating the principle behind multi-directional pixel processing (step 120 from FIG. 1) according to one embodiment of the invention.

FIG. 5A is a block diagram illustrating an exemplary base and new frames. FIG. 5A includes a base frame 510 and a new frame 512. The base frame 510 can represent, for example, a previously processed and stored frame in a motion video sequence, while the new frame 512 represents a current frame that requires processing.

Both the base frame 510 and the new frame 512 consist of five rows and six columns of pixels. Furthermore, both frames include a pixel group 540 which includes three darkly shaded pixels. In both frames, the pixel group 540 includes one pixel at a pixel location 550. For illustrative purposes, the shading of the three pixels in the pixel group 540 is used to indicate that the pixel group consists of similar or substantially the same pixels. Likewise, it is assumed that unshaded pixels in the base frame 510 and the new frame 512 are substantially similar to each other, yet different from the pixels in the (shaded) pixel group 540. It should be appreciated that any number of pixel characteristics can be used to determine pixel similarities/differences (e.g., color, luminance, etc.), and that FIG. 5A is meant only to illustrate the principle of multi-directional pixel processing.

As shown in FIG. 5A, the pixel group 540 occupies a different spatial location in the new frame 512 relative to its spatial location in the base frame 510. The difference in the spatial location of the pixel group 540 in the two frames can represent, for example, the motion of an object in the video image or a variety of changes in pixel characteristics between frames in a sequence of motion video frames (e.g., the motion of an object relative to the frame).

FIG. 5B is a block diagram illustrating a pixel directional map 520 generated using the hybrid pixel-by-pixel compression technique described with reference to FIGS. 2A–B according to one embodiment of the invention. The pixel directional map 520 is based on estimating pixels in the new frame 512 by processing the pixels in the new frame 512 from left to right and from top to bottom. The pixel directional map 520 shows values corresponding to directions from TABLE 1 that can be used to predict each pixel in the pixel group 540 of the new frame 512. As a result of the direction in which the pixels are processed to generate the pixel directional map 520—namely, from left to right and from top to bottom——one pixel is encoded as "new", as indicated with a value of "–1" by the new pixel 530.

To improve the compression ratio by minimizing the number of pixels that are encoded as "new", alternative directions are used in the described embodiment of the invention. To illustrate, FIG. 5C is a block diagram illustrating an alternative pixel directional map 522 generated using the hybrid pixel-by-pixel compression technique described with reference to FIGS. 2A–B according to one embodiment of the invention. The alternative pixel directional map 522 represents the results of processing the pixels in the new frame 512 using an alternative direction— namely, from right to left and bottom to top. As with the pixel directional map 520, the alternative pixel directional map 520 also shows values corresponding to directions from TABLE 1 that can be used to predict each pixel in the pixel group 540 of the new frame 512.

In contrast to the pixel directional map 520 that is based on processing the pixels in the new frame from left to right and from top to bottom, none of the pixels in the pixel group 540 of the new frame 512 need to be encoded as "new", as shown by the values in the alternative pixel directional map 522. By using an alternative direction to process the pixels in the new frame 512, the results of which are shown by the alternative pixel directional map 522, the pixel at the pixel location 550 can be encoded as static (hence the value zero is placed in the alternative pixel directional map 522 at the pixel location 550). Then, other pixels in the pixel group 540 can be predicted by a direction (e.g., the direction corresponding to the value "3" in TABLE 1), and none of the pixels require encoding as new.

In the described embodiment, the direction in which pixels are processed is varied between successive frames in a motion video sequence. It should be appreciated that alternative embodiments of the invention use any number of multi-directional pixel processing techniques. For example, while the described embodiment performs bi-directional pixel processing—e.g., processing a frame from left to right and top to bottom and/or from right to left and bottom to top—alternative embodiments use any number of directions for processing pixels. Furthermore, while the described embodiment alternates the direction(s) in which pixels are processed between frames in a motion video sequence (e.g., odd frames are processed in a direction and even frames are processed in an alternative direction), alternative embodiments of the invention process each new frame using more than one direction and select the direction that results in optimum compression of pixel data. It should also be appreciated that alternative embodiments of the invention do not necessarily perform multi-directional pixel processing.

Furthermore, while the described embodiment selects an alternative pixel processing direction for the next frame in step 120, alternative embodiments may determine a processing direction prior to step 120 or any time thereafter.

III. Decompression and Frame Restoration

Figure 6:
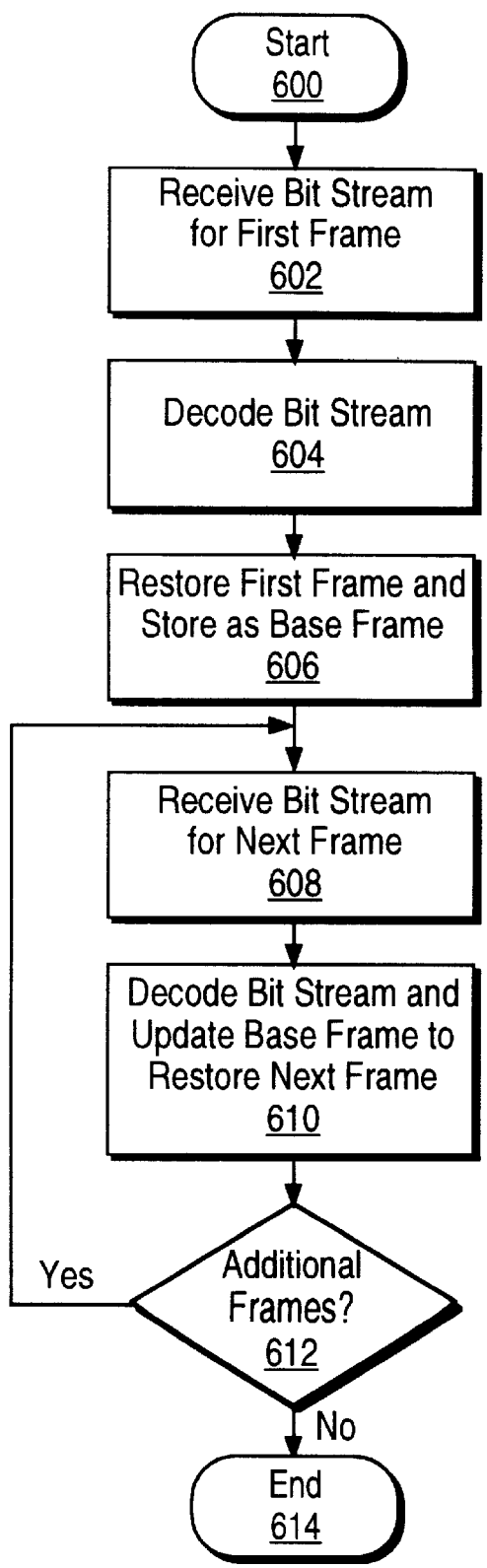
FIG. 6 is a flow diagram illustrating a method for decompression (decoding) of motion video data that has been encoded according to one embodiment of the invention.

FIG. 6 is a flow diagram illustrating a method for decompression (decoding) of motion video data that has been encoded according to one embodiment of the invention. Flow begins in step 600 and passes to step 602.

In step 602, a bit stream having data representing the (encoded) first frame of a motion video data (frame) sequence is received, and flow passes to step 604.

In step 604, the bit stream is decoded using the inverse operations performed in encoding the first frame, and flow passes to step 606. For example, if the data was encoded using an adaptive VLC, as described with reference to FIG. 4, the data may be decoded adaptively also, such that information regarding a particular VLC that was selected for encoding does not necessarily need to be included in the bit stream that is received, but may be determined from the data in the encoded bit stream.

In step 606, the first frame is restored and stored as a base frame, typically in a frame buffer or any number of types of storage devices, and flow passes to step 608. The first frame may also be transmitted, displayed, etc.

In step 608, a bit stream representing the next (new) frame in the motion video sequence is received, and flow passes to step 610.

In step 610, the bit stream for the new frame is decoded and the base frame is updated using values representing pixels in the new frame, and flow passes to step 612. In the described embodiment, the pixels in the next frame are directionally estimated and encoded with directional values, such as those described with reference to FIGS. 2A–B. Once the base frame is updated with information contained in the bit stream for the new frame, the updated base frame is stored, transmitted, displayed, etc. It should be understood that directional decoding, (adaptive) VLC decoding, as well as the updating of the base frame may be performed on the fly for each or a set of pixels in the new frame, depending on the technique used to encode the new frame.

In step 612, if it is determined that additional frames require processing, flow returns to step 608 where the updated base frame serves as a base frame for the next new frame. Otherwise, flow passes to step 614 where flow ends.

It should be appreciated that since data decompression typically involves performing inverse operations used in compressing the data, for every alternative embodiment of compression, there is a corresponding decompression technique. Additionally, while one embodiment has been described with respect to the decompression of compressed motion video data, the present invention can be utilized for data representing still images and/or motion video. Furthermore, in motion video implementations, frames in addition to a base frame and a new frame could be used to compress (encode) and/or restore a current frame.

IV. Hardware Overview

Since the invention involves pixel-by-pixel encoding/decoding techniques, relatively simple and fast hard-wired implementations may be realized. In one embodiment, the invention is implemented on a single chip that interfaces between a port (e.g., a parallel port) of a computer system and a video data input device (e.g., a motion video camera, a still camera, machine-readable storage medium having video data stored therein, etc.). In this implementation, the invention may be utilized in any number of applications, such as video teleconferencing, motion/still video editing/viewing, etc. However, it should also be appreciated that the invention could be implemented in any combination of hard-wired circuitry and/or software instructions. For example, in one embodiment, the invention is implemented by software executing on a general purpose processor.

Figure 7:
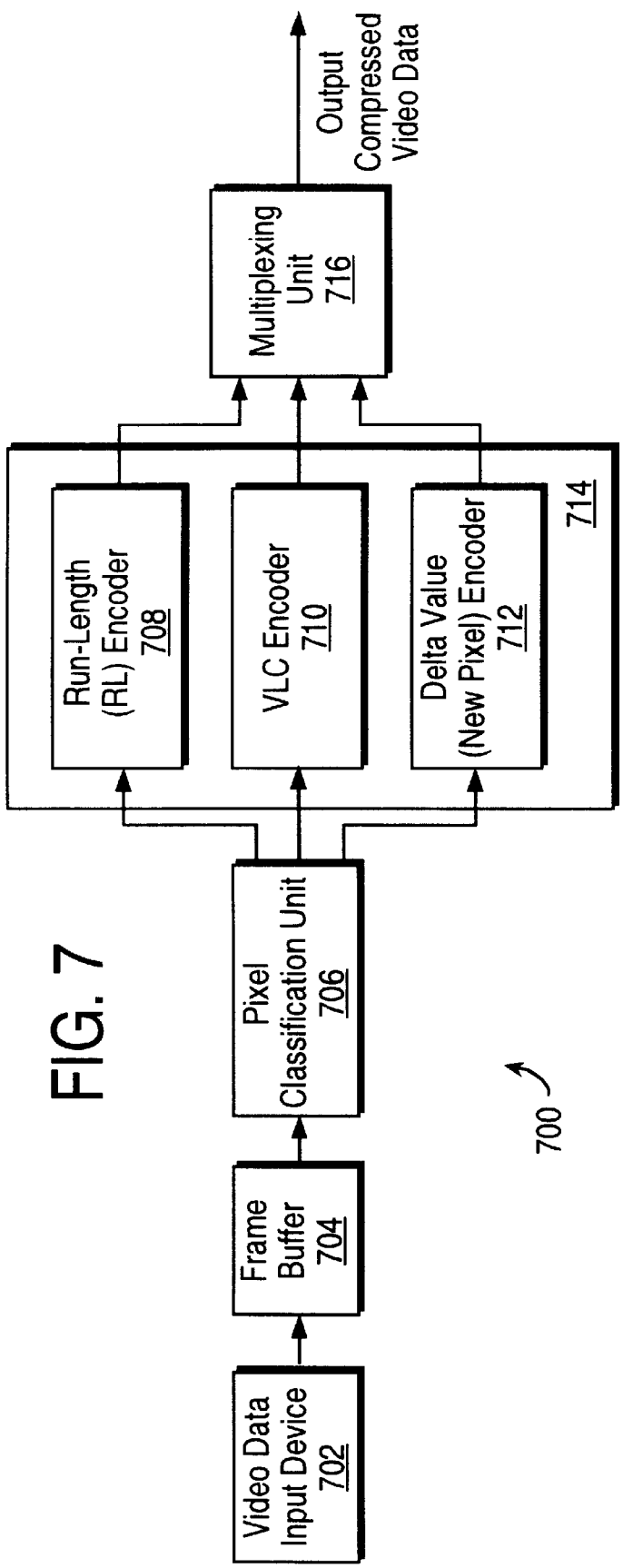
FIG. 7 is a block diagram of an encoding/decoding system according to one embodiment of the invention.

FIG. 7 is a block diagram of a image data compression system according to one embodiment of the invention. The system depicted in FIG. 7 may be utilized in still image and/or motion video applications. In FIG. 7, an image data compression system 700 is shown which includes a frame buffer 704 that receives input video data from a video data input device 702. The video data input device may be a data transmission medium for receiving still and/or motion video data or any type of image data source, such as a motion video camera, a still image (digital) camera, computer animation, a storage medium, a video conferencing link, etc. In one embodiment of the invention, the system 700 resides in video data input device such a digital video camera.

The frame buffer 704 is coupled to a pixel classification unit 706. The frame buffer 704 can be used to store a base frame, a composite base frame, a new frame, and/or additional frames of a motion video sequence. Alternative embodiments may utilize more than one frame buffer. The pixel classification unit 706 processes pixels in a current frame as static, new, and/or directionally estimated. In motion video implementations, the pixel classification unit 706 may determine directions for estimation pixels based on processed pixels of the current frame, composite base frame, and/or other frames in the motion video sequence. In still image implementations, previously processed pixels of the image may be used to estimate other pixels in the image. In certain embodiments, the pixel classification unit 706 also performs any of the following: (1) reduction of the set of directions that may be used for directionally estimating a pixel; (2) monitoring of a set of performance parameters; (3) adaptive updating of compression thresholds; (4) multi-directional pixel processing; and/or (5) post-processing.

The pixel classification unit 706 is coupled to an encoding unit 714. The encoding unit 714 includes a run-length (RL) encoder 708, a VLC encoder 710, and a delta value encoder 712. Once pixels are processed by the pixel classification unit 706 (e.g., classified with directional value such as those shown in TABLE 1), the encoding unit 714 performs additional data compression using one or more of the RL encoder 708, the VLC encoder 710, and the delta value encoder 712, depending on the classification of each pixel or sets of pixels. For example, directionally estimated pixels are encoded by the VLC encoder 710 using adaptive variable length coding (VLC). Thus, the VLC encoder 710 is capable of adaptively and dynamically determining VLCs (e.g., Huffman) codes for encoding various sets of pixels in a frame and selecting an optimum VLC for encoding each set of pixels.

Alternative embodiments may utilize any number of types of encoders/encoding techniques in the encoding unit 714 for further encoding data provided by the pixel classification unit 706. In one embodiment, the pixel classification unit 706 and the encoding unit 714 are operatively coupled to perform pixel classification (e.g., directional estimation) and further encoding (e.g., adaptive VLC encoding, RL encoding, delta encoding, etc.) and/or adaptive generation of codes (e.g., VLCs such as Huffman codes) "on the fly" (e.g., as one or more pixels in a current frame are processed by the pixel classification unit 706, the encoding 714 determines an optimum code or set of codes and further encodes the data provided by the pixel classification unit 706 using a selected optimum code.

The encoding unit 714 is coupled to a multiplexing unit 716, wherein encoded pixel data is multiplexed into a bit stream and output. The output data may be stored and/or transmitted (e.g., to a decoding unit that operates to decode data compressed according to the present invention). For example, in a digital video camera that contains the system 700, the output data may be stored in a machine readable medium on the camera.

Figure 8:
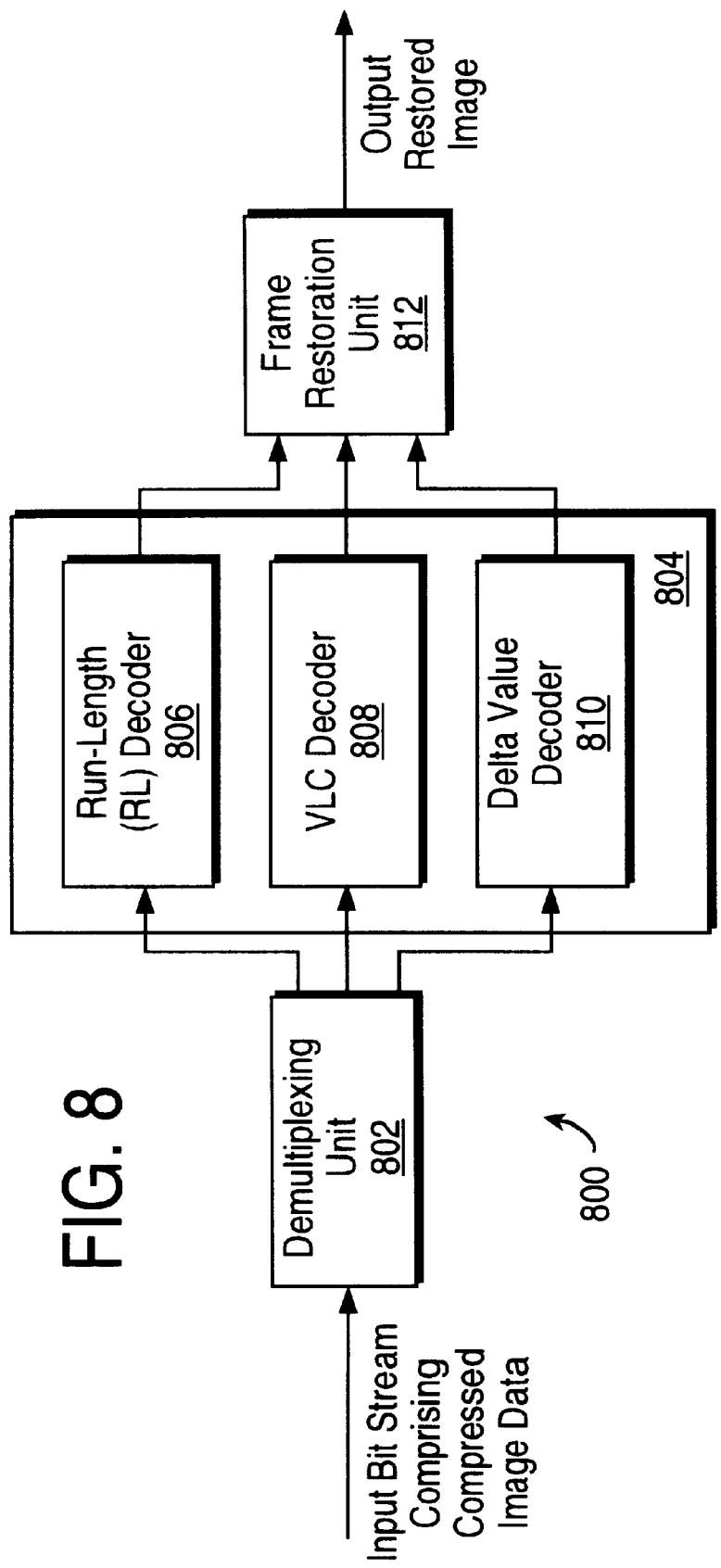
FIG. 8 is a block diagram of an image data decompression system according to one embodiment of the invention.

FIG. 8 is a block diagram of a image data decompression system according to one embodiment of the invention. A decompression system 800 includes a demultiplexing unit 802, a decoding unit 804, and a frame restoration unit 812. The decompression system 800 may be implemented on a chip along with the compression system 700 or in separate circuitry. In embodiments wherein the compression system 700 and the decompression system 800 are integrated, some or all of the elements may be shared between the two systems, thereby saving chip space. Furthermore, the system 800 may include any number of other devices, such as a frame buffer, not shown in FIG. 8.

In the system 800 of FIG. 8, the demultiplexing unit 802 is coupled to receive an input bit stream that includes image data compressed according to the present invention. The demultiplexing unit 802 is coupled to the decoding unit 804 to receive the compressed data. The compressed data is decoded by the decoding unit 804, which, in the described embodiment, includes a run-length (RL) decoder 806, a VLC decoder 808, and a delta value decoder 810 (for decoding new pixel data). The frame restoration unit 812 receives the decoded pixel data from the decoder 814 and restores the image represented by the input compressed data. The output image may represent a still image or motion video frame. Finally, the frame restoration unit 812 outputs the restored image for display, storage, transmission, etc.

In an embodiment wherein the current frame is a motion video frame and a base frame (and/or other frames) has already been processed and stored, the frame restoration unit 812 updates the base frame with pixel estimation data contained in the bit stream for the current frame. Furthermore, in an embodiment wherein directional pixel estimation and variable length coding (VLC) are performed "on the fly" to generate the bit stream, then the frame restoration unit 812 and the decoding unit 804 operate in parallel to decode the bit stream and update the base frame with pixel estimation data for the current frame "on the fly" as well.

While one embodiment has been described wherein the invention is implemented in hard-wired circuitry on an integrated circuit (IC) package, it should be appreciated that there are a number of techniques and structures for implementation of the invention. For example, in one embodiment, an encoder and/or decoder according to the present invention can be implemented on a dedicated video interface card to be used with a computer system. In an alternative embodiment, the invention could be implemented as software instructions in a computer having one or more general purpose and/or dedicated processors. Yet other embodiments may use any combination of dedicated and/or shared devices in combination with software instructions.

V. Alternative Embodiments

While the invention has been described in terms of several embodiments, those skilled in the art will recognize that the invention is not limited to the embodiments described. The method and apparatus of the invention can be practiced with modification and alteration within the spirit and scope of the appended claims. The description is thus to be regarded as illustrative instead of limiting on the invention.

What is claimed is:

1. A computer implemented data compression method comprising:

determining a direction from a plurality of directions for encoding a single pixel in a current frame of a motion video sequence, said plurality of directions identifying pixels in a previously processed frame and previously processed pixels of said current frame, wherein the determining of the direction from the plurality of directions for encoding the single pixel is independent of determinations of directions for encoding other pixels in the current frame of the motion video sequence;

encoding said single pixel based on said direction, where the encoding of the single pixel is independent of encoding of other pixels in the current frame of the motion video sequence.

2. The method of claim 1 further comprising:

selecting a reduced set of directions from said plurality of directions, wherein all pixels identified by directions included in said reduced set of directions are unique relative to each other according to a predetermined threshold.

3. The method of claim 2, wherein said encoding further includes:

selecting a first of a set of variable length codes (VLCs) each having a different number of states, wherein the number of states in the first of said set of VLCs equals the number of directions in said reduced set of directions; and encoding said single pixel with said first of said set of variable length codes.

4. The method of claim 1, wherein pixels in said current frame are processed in a first direction, and pixels in another frame in said sequence of motion video frames are processed in a second direction, said second direction being different from said first direction.

5. The method of claim 1, wherein said determining and said encoding is performed according to a pixel-by-pixel compression technique.

6. A machine-implemented pixel-by-pixel data compression method for encoding data representing a single pixel in an image, said method comprising:

reducing a plurality of directions into a reduced set of directions, said plurality of directions identifying pixels, wherein all pixels identified by directions included in said reduced set of directions are unique relative to each other according to a predetermined threshold;

determining a direction in said reduced set of directions that sufficiently approximates said single pixel, wherein the determining of the direction in said reduced set of directions that sufficiently approximates said single pixel is independent of determinations of directions for other pixels in the current frame of the motion video sequence; and encoding said single pixel based on said direction, where the encoding of the single pixel is independent of encoding of other pixels in the current frame of the motion video sequence.

7. The method of claim 6, wherein said image represents either a still or motion image frame.

8. The method of claim 6, wherein said image represents a current frame in a sequence of motion video frames.

9. The method of claim 8, wherein the pixels identified by said plurality of directions belong to at least one of said current frame and another frame in said sequence of motion video frames.

10. The method of claim 6, wherein said encoding includes:

selecting a first variable length code for encoding said single pixel based on said reduced set of directions, said first variable length code having a first number of states that is equal to the number of directions in said reduced set of directions; and encoding said single pixel using said first variable length code.

11. The method of claim 10, further comprising:

generating a second variable length code for encoding another pixel in said image, said second variable length code having a second number of states, said second number of states being unequal to said first number of states in said first variable length code and being based on another set of directions.

12. An apparatus for performing data compression comprising:

a first means for determining a direction from a plurality of directions for encoding a single pixel in a current frame of a motion video sequence, said plurality of directions identifying at least one pixel in a previously processed frame and at least one previously processed pixel of said current frame, wherein the determining of the direction from the plurality of directions for encoding the single pixel is independent of determinations of directions for encoding other pixels in the current frame of the motion video sequence;

a second means for encoding said single pixel based on said direction, where the encoding of the single pixel is independent of encoding of other pixels in the current frame of the motion video sequence.

13. The apparatus of claim 12, further comprising:

a selection means for selecting a reduced set of directions from said plurality of directions, wherein all pixels identified by directions in said reduced set of directions are unique relative to each other according to a predefined threshold.

14. The apparatus of claim 13, further comprising:

a third means for selecting a first of a set of variable length codes (VLCs) each having a different number of states, wherein the number of states in said first of said set of VLCs equals the number of directions in said reduced set of directions.

15. The apparatus of claim 12, further comprising:

a third means for processing said current frame in a first pixel processing direction and another frame in a second pixel processing direction, wherein said first and second pixel processing directions are different.

16. The apparatus of claim 12, wherein said first and second means perform a pixel-by-pixel compression technique.

17. A machine-readable medium having stored thereon executable data that cause a machine to perform a method comprising:

determining a direction from a plurality of directions for encoding a single pixel in a current frame of a motion video sequence, said plurality of directions identifying at least one pixel in a previously processed frame and at least one previously processed pixel of said current frame, wherein the determining of the direction from the plurality of directions for encoding the single pixel is independent of determinations of directions for encoding other pixels in the current frame of the motion video sequence;

encoding said single pixel based on said direction, where the encoding of the single pixel is independent of encoding of other pixels in the current frame of the motion video sequence.

18. The machine-readable medium of claim 17, said method further comprising:

selecting a reduced set of directions from said plurality of directions, wherein pixels identified by directions in said reduced set of directions are unique relative to each other according to a predefined threshold.

19. The machine-readable medium of claim 18, said method further comprising:
selecting a first of a set of variable length codes (VLCs) each having a different number of states, wherein the number of states in said first of said set of VLCs equals the number of directions in said reduced set of directions.

20. The machine-readable medium of claim 17, said method further comprising:
processing said current frame in a first pixel processing direction and another frame in a second pixel processing direction, wherein said first and second pixel processing directions are different.

21. The machine-readable medium of claim 17, wherein said encoding is performed according to a pixel-by-pixel compression technique.

22. An apparatus for pixel-by-pixel encoding of data representing a single pixel in an image, said apparatus comprising:
a first means for reducing a plurality of directions into a reduced set of directions, said plurality of directions identifying pixels, wherein all pixels identified by directions included in said reduced set of directions are unique relative to each other according to a predefined threshold;
a second means for determining a direction in said reduced set of directions that sufficiently approximates said single pixel, wherein the second means for determining of the direction in said reduced set of directions that sufficiently approximates said single pixel is independent of determinations of directions for other pixels in the current frame of the motion video sequence; and
a third means for encoding said single pixel based on said direction, where the third means for encoding of the single pixel is independent of encoding of other pixels in the current frame of the motion video sequence.

23. The apparatus of claim 22, wherein said image represents one of a still image frame and a motion image frame.

24. The apparatus of claim 22, wherein at least one of said pixels identified by said plurality of directions is derived from said image, said image being a first frame in a motion image sequence, and at least another of said pixels identified by said plurality of directions is derived from a second frame in said motion video sequence.

25. The apparatus of claim 24, further comprising:
a fourth means for processing said first frame in a first pixel processing direction and said second frame in a second pixel processing direction, wherein said first and second pixel processing directions are different.

26. The apparatus of claim 22, further comprising:
a code selection means for selecting one of a plurality of variable length codes (VLCs) for encoding pixels of said image, wherein each selected one of said plurality of VLCs has a number of states equal to the number of directions used to encode a particular one of said pixels.

27. A machine-readable medium having stored thereon executable data that cause a machine to perform a method comprising:
reducing a plurality of directions into a reduced set of directions, said plurality of directions identifying pixels, wherein all pixels identified by directions included in said reduced set of directions are unique relative to each other according to a predefined threshold;
determining a direction in said reduced set of directions that sufficiently approximates a single pixel, wherein the determining of the direction in said reduced set of directions that sufficiently approximates the single pixel is independent of determinations of directions for other pixels in the current frame of the motion video sequence; and
encoding said single pixel based on said direction, where the encoding of the single pixel is independent of encoding of other pixels in the current frame of the motion video sequence.

28. A machine-implemented decompression method comprising:
receiving an indication indicating a direction of a plurality of directions for decoding a single pixel in a current frame of a motion video sequence, said plurality of directions identifying pixels in a previously processed frame and previously processed pixels of said current frame, wherein the direction of said plurality of directions is determined independent of determinations of directions for other pixels in the current frame of the motion video sequence; and
decoding said single pixel based on said direction.

29. The method of claim 28, wherein pixels identified by directions in said plurality of directions are unique relative to each other according to a predefined threshold.

30. The method of claim 29, further comprising:
decoding said pixel according to a first of a set of variable length codes (VLCs) each having a different number of states, wherein the number of states in said first of said set of VLCs equals the number of directions in said plurality of directions.

31. The method of claim 28, further comprising:
processing said current frame in a first pixel processing direction and another frame in a second pixel processing direction, wherein said first and second pixel processing directions are different.

32. The method of claim 28, wherein said receiving and decoding is performed according to a pixel-by-pixel compression technique.

33. An apparatus for decoding encoded data comprising:
a first means for receiving an indication indicating a direction of a plurality of directions for decoding a single pixel in a current frame of a motion video sequence, said plurality of directions identifying pixels in a previously processed frame and previously processed pixels of said current frame, wherein the direction of said plurality of directions is determined independent of determinations of directions for other pixels in the current frame of the motion video sequence; and
a second means for decoding said single pixel based on said direction.

34. The apparatus of claim 33, wherein pixels identified by directions in said plurality of directions are unique relative to each other according to a predefined threshold.

35. The apparatus of claim 34, further comprising:
a decoding means for decoding said single pixel according to a first of a set of variable length codes (VLCs) each having a different number of states, wherein the number of states in said first of said set of VLCs equals the number of directions in said reduced set of directions.

36. The apparatus of claim 33, further comprising:
a third means for processing said current frame in a first pixel processing direction and another frame in a second pixel processing direction, wherein said first and second pixel processing directions are different.

37. The apparatus of claim 33, wherein said first and second means perform a pixel-by-pixel compression technique.

38. An image data compression method comprising:
receiving information representing a single pixel in a current frame of a motion video sequence;
selecting a direction from plurality of directions to encode said single pixel in said current frame, said plurality of directions specifying a set of encoding pixels, said set of encoding pixels being individual ones and/or combinations of a set of actual pixels, said set of actual pixels including at least one pixel in a previously processed frame and at least one previously processed pixel of said current frame, wherein the selecting of the direction from the plurality of directions to encode said single pixel in said current frame is independent of selections of directions to encode other pixels in the current frame; and
encoding said single pixel with an indication identifying said direction, where the encoding of said single pixel is independent of encoding of other pixels in the current frame.

39. The method of claim 38, further comprising:
outputting said indication.

40. The method of claim 38, further comprising:
storing said indication.

41. The method of claim 38, further comprising:
determining a reduced set of directions from said plurality of directions, wherein encoding pixels identified by directions in said reduced set of directions are unique relative to each other according to a predefined threshold.

42. The method of claim 38, further comprising:
selecting a first of a set of variable length codes (VLCs) each having a different number of states, where in the number of states in said first of said set of VLCs equals the number of directions in said reduced set of directions.

43. The method of claim 38, further comprising:
processing said cur rent frame in a first pixel processing direction; and
processing another frame in said motion video sequence in a second pixel processing direction, wherein said first and second pixel processing directions are different.

44. A data compression method for pixel-by-pixel encoding data representing a single pixel in an image, said method comprising:
determining a plurality of directions to encode said single pixel, wherein at least one of said plurality of directions corresponds to another pixel in said image; reducing said plurality of directions into a reduced set of directions, wherein data corresponding to each direction included in said reduced set of directions is unique relative to each other according to a predefined threshold, wherein the determining of the direction of the plurality of directions to encode said single pixel is independent of determinations of directions to encode other pixels in said image;
selecting a direction in said reduced set of directions that sufficiently approximates said single pixel; and
encoding said single pixel based on said direction, where the encoding of said single pixel is independent of encoding of other pixels in said image.

45. The method of claim 44, further comprising:
including in said plurality of directions at least one direction that represents a combination of two pixels.

46. The method of claim 45, wherein a first of said combination of two pixels is contained in a current frame representing said image, and a second of said combination of two pixels is contained in another frame.

47. The method of claim 45, wherein both of said combination of two pixels are contained in said image.

48. The method of claim 44, wherein said image represents one of a still image frame and a motion image frame.

49. The method of claim 44, wherein said image is a first frame in a motion image sequence, and at least another of said pixels identified by said plurality of directions is derived from a second frame in said motion video sequence.

50. The method of claim 49, further comprising:
processing said first frame in a first pixel processing direction and said second frame in a second pixel processing direction, wherein said first and second pixel processing directions are different.

51. The method of claim 44, further comprising:
selecting a code from a plurality of codes to encode said single pixel, said code including a number of states corresponding to a number of directions in said reduced set of directions.

52. A computer-implemented method comprising:
selecting as part of a pixel-by-pixel compression technique a direction for encoding a single pixel in an image being compressed, wherein part of said image has already been encoded, and wherein said direction identifies a previously encoded pixel of said image or a combination of pixels that includes said previously encoded pixel of said image, wherein said selecting includes selecting said direction from a plurality of directions, said plurality of directions specifying a set of encoding pixels, said set of encoding pixels being individual ones and/or combinations of a set of actual pixels, said set of actual pixels including at least one pixel in a previously processed frame and at least one previously processed pixel of said current frame, wherein the selecting of the direction for encoding the single pixel is independent of selecting directions for encoding other pixels in said image; and
encoding said single pixel based on said direction, where the encoding of said single pixel is independent of encoding of other pixels in said image.

53. The computer-implemented method of claim 52, wherein said selecting includes:
selecting said direction from a plurality of directions, wherein each of said plurality of directions identifies a different pixel or combination of pixels.

54. The computer implemented method of claim 52, wherein said image is a still image.

55. The computer implemented method of claim 52, wherein said image is a current frame in a motion video sequence.

56. The computer-implemented method of claim 55, wherein said selecting said direction includes:
selecting a reduced set of directions from said plurality of directions, wherein all encoding pixels identified by directions included in said reduced set of directions are unique relative to each other according to a predetermined threshold.

57. The computer-implemented method of claim 56 further comprising:
selecting a first of a set of variable length codes (VLCs) each having a different number of states, wherein the number of states in the first of said set of VLCs equals the number of directions in said reduced set of directions; and
wherein said encoding is performed with said first variable length codes.

58. The computer-implemented method of claim 52, wherein said selecting includes:

selecting said direction from a plurality of directions, wherein at least one of said plurality of directions identifies a combination of actual pixels.

59. A machine-readable medium having stored therein executable data that cause a machine to perform a method comprising:

selecting as part of a pixel-by-pixel compression technique a direction for encoding a single pixel in an image being compressed, wherein part of said image has already been encoded, and wherein said direction identifies a previously encoded pixel of said image or a combination of pixels that includes said previously encoded pixel of said image, wherein said selecting includes selecting said direction from a plurality of direction, said plurality of directions specifying a set of encoding pixels, said set of encoding pixels being individual ones and/or combinations of a set of actual pixels, said set of actual pixels including at least one pixel in a previous frame and at least one previously processed pixel of said current frame, wherein the selecting of the direction for encoding the single pixel in the image is independent of selecting directions for encoding other pixels in said image; and encoding said single pixel based on said direction, where the encoding of said single pixel is independent of encoding of other pixels in said image.

60. The machine readable medium of claim 59, wherein said selecting includes:

selecting said direction from a plurality of directions, wherein each of said plurality of directions identifies a different pixel or combination of pixels.

61. The machine-readable medium of claim 60, wherein said image is a current frame in a motion video sequence.

62. The machine readable medium of claim 59, wherein said image is a still image.

63. The machine-readable medium of claim 62, wherein said selecting said direction includes:

selecting a reduced set of directions from said plurality of directions, wherein all pixels identified by directions included in said reduced set of directions are unique relative to each other according to a predetermined threshold.

64. The machine-readable medium of claim 63 further comprising:

selecting a first of a set of variable length codes (VLCs) each having a different number of states, wherein the number of states in the first of said set of VLCs equals the number of directions in said reduced set of directions; and wherein said encoding is performed with said first variable length code.

65. The machine-readable medium of claim 59, wherein said image is a current frame in a motion video sequence.

66. The machine-readable medium of claim 59, wherein said selecting includes:

selecting said direction from a plurality of directions, wherein at least one of said plurality of directions identifies a combination of actual pixels.

67. A method comprising:

accessing pixel data at a current single pixel location in a current frame of a motion video sequence as part of a pixel-by-pixel compression technique, wherein there is a pixel location in a composite frame that is in the same spatial location as said current single pixel location in said current frame, said composite frame comprising a processed pixel region and a base pixel region, said processed pixel region surrounding part of said current single pixel location and including the result of decoding previously encoded pixels from said current frame, said base pixel region surrounding part of said current pixel location and including the result of decoding previously encoded pixels from a previous frame;

selecting an indication that identifies pixel data in said composite frame that best matches the pixel data at said current single pixel location in said current frame, wherein the selecting of the indication is independent of selecting the indications for pixel data at other pixel locations in said current frame; and encoding said indication, where the encoding of said indication is independent of encoding of other indications for in said current frame.

68. The method of claim 67, wherein said selecting includes:

comparing said pixel data accessed from said current frame to pixels and/or combinations of pixels surrounding said current pixel location in said composite frame.

69. The method of claim 67, wherein said selecting includes:

comparing said pixel data accessed from said current frame to at least one piece of pixel data generated from combining pixel data from two different pixel locations in said composite frame surrounding said current pixel location.

70. An apparatus comprising:

a set of one or more frame buffers;

a pixel classification unit coupled to said set of frame buffers to separately classify individual pixels of a current frame as static, new, or directionally estimated in relation to a composite frame, said composite frame formed by starting with a base frame and overwriting pixels with the result of decoding previously encoded pixels from the current frame on the fly;

a encoding unit coupled to said pixel classification unit to separately encode individual pixels of said current frame according to said classifications in relation to said composite frame, wherein the encoding unit is to separately encode each pixel of the individual pixels independent of other individual pixels in said current frame; and a multiplexing unit coupled to said encoding unit.

71. The apparatus of claim 70, said set of frame buffers to store said composite base frame and said current frame.

72. The apparatus of claim 70, wherein said encoding unit includes:

a run-length encoder to encode pixels classified as static;

a variable length encoder to encode pixels classified as directionally estimated; and a delta value encoder to encode pixels classified as new.

73. An apparatus comprising:

a set of one or more frame buffers to store a current frame and a composite base frame, said composite base frame starting as the result of decoding an encoded previous frame and being updated on the fly with the result of decoding encoded pixels of the current frame;

a pixel classification unit coupled to said set of frame buffers to individually select on a pixel-by-pixel basis a direction from a plurality of directions for encoding pixels in said current frame, said plurality of directions identifying pixel data that is based on pixels at pixel locations in said composite base frame at and surrounding the current pixel location in said current frame being encoded;

a encoding unit coupled to said pixel classification unit to separately encode individual pixels of said current frame according to said directions, wherein the encoding unit is to separately encode each pixel of the individual pixels independent of other individual pixels in said current frame; and a multiplexing unit coupled to said encoding unit.

74. The apparatus of claim 73, wherein said plurality of directions can identify at least one pixel location in said composite frame storing a decoded version of a previously encoded pixel from said current frame.

75. The apparatus of claim 73, said pixel classification unit to reduce the plurality of directions to include only directions that identify pixels unique relative to each other according to a predetermined threshold.

76. The apparatus of claim 73, wherein said encoding unit includes:

a run-length encoder to encode pixels whose direction indicates those pixels are static;

a variable length encoder to encode pixels whose direction indicates those pixels best match one or more pixels at different spatial locations in said composite base frame; and a delta value encoder to encode pixels whose direction indicates those pixels are sufficiently different from the pixel values identified by the plurality of directions.

\* \* \* \* \*